United States Patent
Cha et al.

(10) Patent No.: US 12,302,256 B2
(45) Date of Patent: May 13, 2025

(54) METHOD FOR TRANSMITTING AND RECEIVING SIGNAL IN WIRELESS COMMUNICATION SYSTEM, AND APPARATUS SUPPORTING SAME

(71) Applicant: LG ELECTRONICS INC., Seoul (KR)

(72) Inventors: Hyunsu Cha, Seoul (KR); Kijun Kim, Seoul (KR); Hyunsoo Ko, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 17/798,924

(22) PCT Filed: Feb. 15, 2021

(86) PCT No.: PCT/KR2021/001887
§ 371 (c)(1),
(2) Date: Aug. 11, 2022

(87) PCT Pub. No.: WO2021/162513
PCT Pub. Date: Aug. 19, 2021

(65) Prior Publication Data
US 2023/0084239 A1    Mar. 16, 2023

Related U.S. Application Data

(60) Provisional application No. 62/972,729, filed on Feb. 11, 2020.

(51) Int. Cl.
*H04W 52/24*     (2009.01)
*H04W 52/32*     (2009.01)

(52) U.S. Cl.
CPC ....... *H04W 52/241* (2013.01); *H04W 52/245* (2013.01); *H04W 52/325* (2013.01)

(58) Field of Classification Search
CPC ............. H04W 52/241; H04W 52/245; H04W 52/325; H04W 52/242; H04W 52/367;
(Continued)

(56) References Cited

U.S. PATENT DOCUMENTS 9,179,419 B2 * 11/2015 Park ..................... H04B 7/0417
11,147,030 B2 * 10/2021 Shi ...................... H04W 52/146
(Continued)

OTHER PUBLICATIONS

LG Electronics, "Discussions on UL Reference Signals for NR Positioning", R1-1912273, 3GPP TSG RAN WG1 #99, Reno, USA, Nov. 18-22, 2019.
(Continued)

*Primary Examiner* — Dominic E Rego
(74) *Attorney, Agent, or Firm* — BRYAN CAVE LEIGHTON PAISNER LLP

(57) ABSTRACT

Various embodiments relate to a next generation wireless communication system for supporting a higher data transfer rate and the like beyond 4th generation (4G) wireless communication systems. Provided according to various embodiments are a method for transmitting and receiving a signal in a wireless communication system and a device supporting same, and various other embodiments may also be provided.

13 Claims, 24 Drawing Sheets

(58) Field of Classification Search
CPC ... H04W 52/146; H04W 24/08; H04W 64/00; H04B 17/27; H04B 17/309
See application file for complete search history.

(56) References Cited

U.S. PATENT DOCUMENTS

| | | | |
|---|---|---|---|
| 2016/0081033 A1* | 3/2016 | Ouchi | H04L 5/14 455/522 |
| 2018/0027437 A1* | 1/2018 | Vitthaladevuni | H04W 52/325 370/252 |
| 2019/0044681 A1* | 2/2019 | Zhang | H04L 5/0094 |
| 2019/0159136 A1 | 5/2019 | MolavianJazi et al. | |
| 2019/0261320 A1 | 8/2019 | Yu et al. | |
| 2019/0335400 A1* | 10/2019 | Gong | H04W 52/18 |
| 2019/0349867 A1* | 11/2019 | MolavianJazi | H04W 52/16 |
| 2020/0322893 A1* | 10/2020 | Yao | H04W 52/146 |
| 2020/0322903 A1* | 10/2020 | Shi | H04W 52/242 |
| 2021/0112500 A1* | 4/2021 | Takeda | H04W 52/242 |

OTHER PUBLICATIONS

Qualcomm Incorporated, "Summary #3 of 7.2.10.4: PHY procedures for positioning measurements", R1-1913504, 3GPP TSG-RAN WG1 Meeting #99, Reno, NV, USA, Nov. 18-22, 2019.
MCC Support, "Final Report of 3GPP TSG RAN WG1 #98bis v1.0.0 (Chongqing, China, Oct. 14-20, 2019)", R1-1911801, 3GPP TSG RAN WG1 Meeting #99, Reno, USA, Nov. 18-22, 2019, XP051825694.
MediaTek Inc., "Procedure design for NR positioning", 3GPP TSG-RAN WG1 #99 Meeting, Nov. 18-22, 2019, R1-1912115.
Sony, "Remaining issues on NR Positioning Physical Layer Procedures", 3GPP TSG RAN WG1 Meeting #99, Nov. 18-22, 2019, R1-1912363.
Zte, Sanechips, "Modification to multi-power control", 3GPP TSG RAN WG2 Meeting #108, Nov. 18-22, 2019, R2-1914566.

* cited by examiner (a)

(b)

METHOD FOR TRANSMITTING AND RECEIVING SIGNAL IN WIRELESS COMMUNICATION SYSTEM, AND APPARATUS SUPPORTING SAME

CROSS-REFERENCE TO RELATED APPLICATIONS

This application is the National Stage filing under 35 U.S.C. 371 of International Application No. PCT/KR2021/001887, filed on Feb. 15, 2021, which claims the benefit of U.S. Provisional Application No. 62/972,729, filed on Feb. 11, 2020, the contents of which are all hereby incorporated by reference herein in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide an operation method when a downlink (DL) reference signal for uplink (UL) power control is not successfully detected in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method carried out by an apparatus in a wireless communication system may be provided.

According to various embodiments, the method may include: receiving information on a downlink (DL) reference signal (RS) resource related to a path loss reference; and determining whether measurement for a path loss estimation to obtain a transmission power of an uplink (UL) RS is successful, based on the DL RS resource.

According to various embodiments, the DL RS resource may be related to a non-serving cell.

According to various embodiments, whether the measurement for the path loss estimation is successful may be determined based on a measurement value related to a quality of the DL RS resource.

According to various embodiments, whether the measurement for the path loss estimation is successful may be determined based on a comparison result between the measurement value and a first predetermined threshold.

According to various embodiments, the first predetermined threshold may be configured for at least one of: (i) for comparison with at least one of a reference signal received power (RSRP), a reference signal received quality (RSRQ), a signal-to-noise ratio (SNR), a signal-to-interference-plus-noise ratio (SINR), or an error rate value obtained from the DL RS resource; (ii) for comparison with at least one of a ratio or difference between a transmission power of the DL RS resource and a reception power of the DL RS resource; or (iii) for comparison with at least one of a ratio or difference between the reception power of the DL RS resource received from a serving cell and a reception power of another DL RS resource received from the non-serving cell.

According to various embodiments, a timer for determining whether the measurement for the path loss estimation is successful may be configured.

According to various embodiments, the DL RS resource may correspond to one or more DL RS resources received before expiration of the timer.

According to various embodiments, the DL RS resource may correspond to a plurality of DL RS resources.

According to various embodiments, the measurement value may include at least one of: (i) one or more measurement values related to qualities of one or more DL RS resources received within a predetermined time period among the plurality of DL RS resources; (ii) an average value of measurement values related to qualities obtained from the plurality of DL RS resources; or (iii) one or more measurement values included in a predetermined upper or lower range among the measurement values related to the qualities obtained from the plurality of DL RS resources.

According to various embodiments, based on determination that the measurement for the path loss estimation is successful and based on the path loss estimation being greater than or equal to a predetermined second threshold, the UL RS may not be transmitted.

According to various embodiments, the predetermined second threshold may be related to a maximum value allowed for the apparatus to use as the transmission power of the UL RS.

According to various embodiments, the UL RS may be configured to be transmitted in at least one of the following ways: periodically, semi-statically, or aperiodically.

According to various embodiments, based on the determination that the measurement for the path loss estimation is successful and based on the path loss estimation being greater than or equal to the predetermined second threshold, transmission of the UL RS at a time position at which the UL RS is scheduled to be transmitted, which is obtained based on transmission of the configured UL RS, may be ignored.

According to various embodiments, the predetermined second threshold may be related to at least one of: (i) at least one of a ratio or difference between a transmission power required for a path loss compensation to obtain the transmission power of the UL RS and a maximum transmission power of the apparatus depending on a capability of the apparatus; (ii) a maximum transmission power allowed for the apparatus to transmit the UL RS to the non-serving cell; or (iii) at least one of a ratio or difference between a transmission power allowed for the apparatus to transmit the UL RS to a serving cell and the transmission power allowed for the apparatus to transmit the UL RS to the non-serving cell.

According to various embodiments, the method may further include reporting failure in the measurement for the path loss estimation based on determination that the measurement for the path loss estimation is unsuccessful.

According to various embodiments, the UL RS may include a sounding reference signal (SRS) for positioning of the apparatus.

According to various embodiments, an apparatus for operating in a wireless communication system may be provided.

According to various embodiments, the apparatus may include a memory; and one or more processors connected to the memory.

According to various embodiments, the one or more processors may be configured to: receive information on a DL RS resource related to a path loss reference; and determine whether measurement for a path loss estimation to obtain a transmission power of a UL RS is successful, based on the DL RS resource.

According to various embodiments, the DL RS resource may be related to a non-serving cell.

According to various embodiments, whether the measurement for the path loss estimation is successful may be determined based on a measurement value related to a quality of the DL RS resource.

According to various embodiments, based on determination that the measurement for the path loss estimation is successful and based on the path loss estimation being greater than or equal to a predetermined second threshold, the UL RS may not be transmitted.

According to various embodiments, the predetermined second threshold may be related to a maximum value allowed for the apparatus to use as the transmission power of the UL RS.

According to various embodiments, the apparatus may communicate with one or more of a mobile terminal, a network, and an autonomous driving vehicle other than a vehicle in which the apparatus is included.

According to various embodiments, a method carried out by an apparatus in a wireless communication system may be provided.

According to various embodiments, the method may include: obtaining information on a DL RS resource related to a path loss reference; and transmitting the information on the DL RS resource.

According to various embodiments, the DL RS resource may be to determine whether measurement for a path loss estimation to obtain a transmission power of a UL RS is successful.

According to various embodiments, the DL RS resource may be related to a non-serving cell.

According to various embodiments, whether the measurement for the path loss estimation is successful may be determined based on a measurement value related to a quality of the DL RS resource.

According to various embodiments, an apparatus for operating in a wireless communication system may be provided.

According to various embodiments, the apparatus may include a memory; and one or more processors connected to the memory.

According to various embodiments, the one or more processors may be configured to: obtain information on a DL RS resource related to a path loss reference; and transmit the information on the DL RS resource.

According to various embodiments, the DL RS resource may be to determine whether measurement for a path loss estimation to obtain a transmission power of a UL RS is successful.

According to various embodiments, the DL RS resource may be related to a non-serving cell.

According to various embodiments, whether the measurement for the path loss estimation is successful may be determined based on a measurement value related to a quality of the DL RS resource.

According to various embodiments, an apparatus operating in a wireless communication system may be provided.

According to various embodiments, the apparatus may include one or more processors, and one or more memories storing one or more instructions to cause the one or more processors to carry out a method.

According to various embodiments, the method may include: receiving information on a DL RS resource related to a path loss reference; and determining whether measurement for a path loss estimation to obtain a transmission power of a UL RS is successful, based on the DL RS resource.

According to various embodiments, the DL RS resource may be related to a non-serving cell.

According to various embodiments, whether the measurement for the path loss estimation is successful may be determined based on a measurement value related to a quality of the DL RS resource.

According to various embodiments, a processor-readable medium configured to store at least one instruction that causes at least one processor to perform a method may be provided.

According to various embodiments, the method may include: receiving information on a DL RS resource related to a path loss reference; and determining whether measurement for a path loss estimation to obtain a transmission power of a UL RS is successful, based on the DL RS resource.

According to various embodiments, the DL RS resource may be related to a non-serving cell.

According to various embodiments, whether the measurement for the path loss estimation is successful may be determined based on a measurement value related to a quality of the DL RS resource.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

ADVANTAGEOUS EFFECTS

According to various embodiments, a signal may be effectively transmitted and received in a wireless communication system.

According to various embodiments, positioning may be effectively performed in a wireless communication system.

According to various embodiments, criteria for determining whether a downlink (DL) reference signal (RS) related to path loss estimation is properly received and/or whether the path loss estimation is successfully measured may be clearly provided.

According to various embodiments, power consumption of the terminal may be reduced.

According to various embodiments, interference between a serving cell and a non-serving cell may be prevented.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
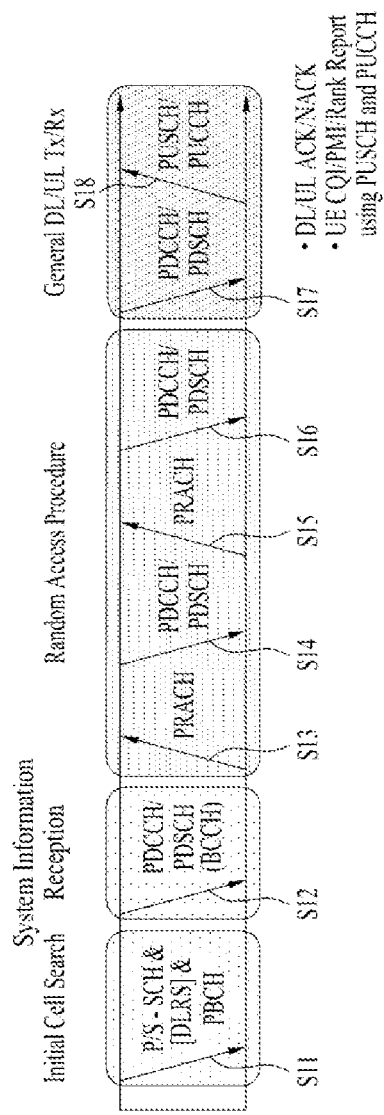
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information).

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
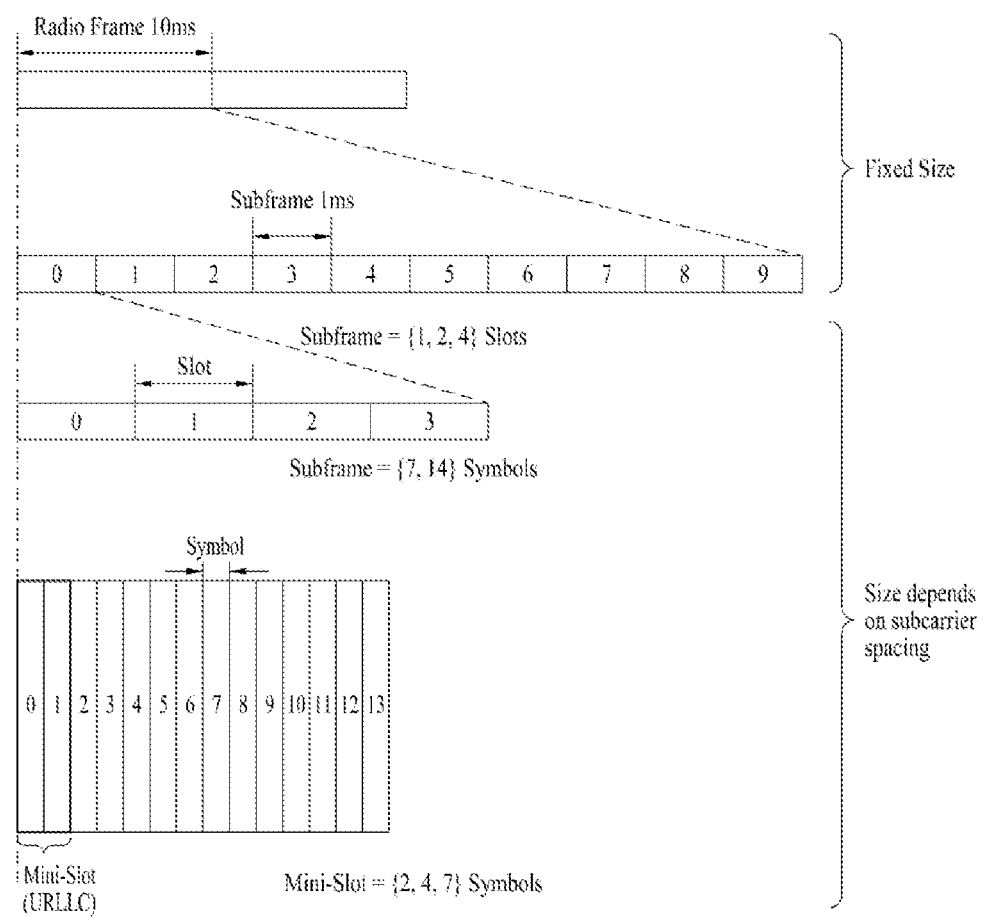
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), µ and a CP are obtained from RRC parameters provided by the BS.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480 * 10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz}) * 2048)$ are placed in the following relationship: $T_s/T_c = 64$. DL and UL transmissions are organized into (radio) frames each having a duration of $T_f = (\Delta f_{max} * N_f/100)$ $*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology µ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{subframe}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| µ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with µ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
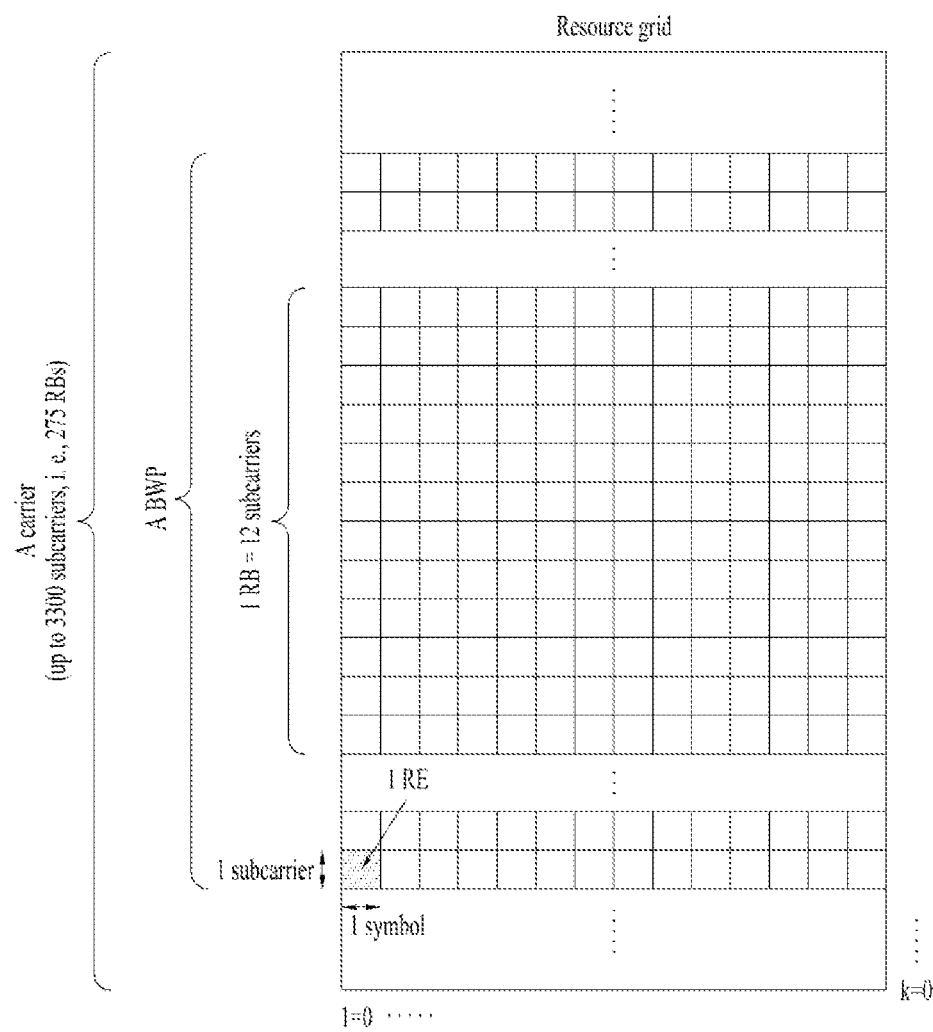
FIG. 3 is a diagram illustrating mapping of physical channels in a slot, to which various embodiments are applicable.

FIG. 3 is a diagram illustrating a slot structure in an NR system to which various embodiments are applicable.

Referring FIG. 3, one slot includes a plurality of symbols in the time domain For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

1.2. Uplink Transmission/Reception Operation

Figure 4:
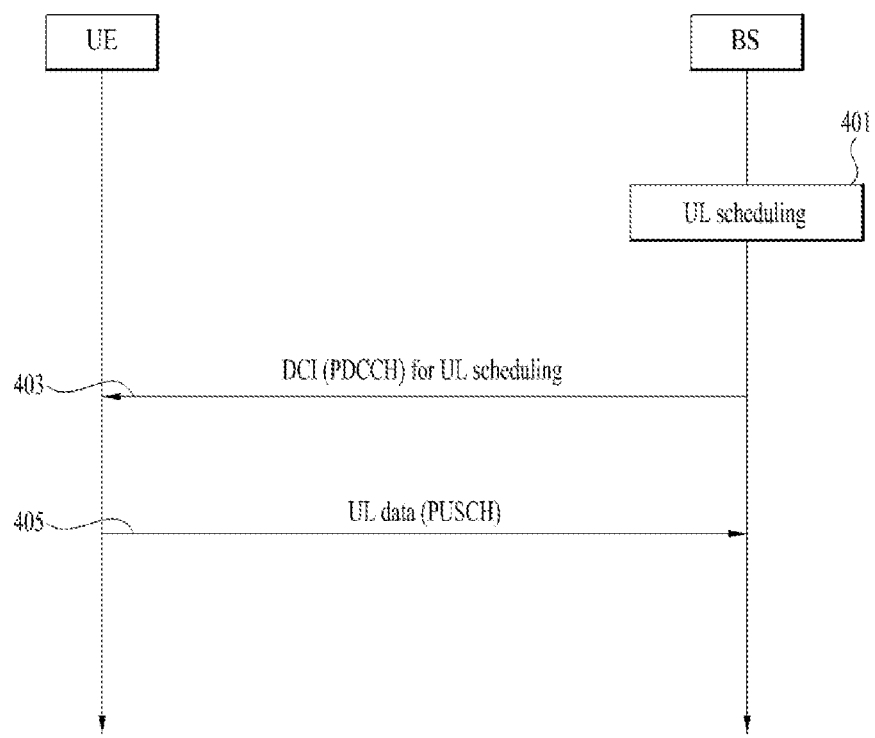
FIG. 4 is a diagram illustrating an exemplary uplink (UL) transmission/reception operation to which various embodiments are applicable.

FIG. 4 is a diagram illustrating an exemplary uplink transmission/reception operation to which various embodiments are applicable.

The BS schedules UL transmission in relation to, for example, frequency/time resources, a transport layer, a UL precoder, and an MCS (401). In particular, the BS may determine, through the above-described operations, a beam for PUSCH transmission of the UE.

The UE receives DCI for UL scheduling (including scheduling information about the PUSCH) from the BS on the PDCCH (403).

DCI format 0_0 or 0_1 may be used for UL scheduling. In particular, DCI format 0_1 includes the following information: an identifier for DCI formats, a UL/supplementary UL (SUL), a bandwidth part indicator, frequency domain resource assignment, time domain resource assignment, a frequency hopping flag, a modulation and coding scheme (MCS), an SRS resource indicator (SRI), precoding information and number of layers, antenna port(s), an SRS request, DMRS sequence initialization, and UL shared channel (UL-SCH) indicator.

In particular, SRS resources configured in an SRS resource set associated with the higher layer parameter 'usage' may be indicated by the SRS resource indicator field. In addition, 'spatialRelationInfo' may be configured for each SRS resource, and the value thereof may be one of {CRI, SSB, SRI}.

The UE transmits UL data to the BS on PUSCH (405). When the UE detects a PDCCH including DCI format 0_0 or 0_1, it transmits the PUSCH according to an indication by the DCI.

For PUSCH transmission, two transmission schemes are supported: codebook-based transmission and non-codebook-based transmission:

i) When the higher layer parameter 'txConfig' is set to 'codebook', the UE is configured for codebook-based transmission. On the other hand, when the higher layer parameter 'txConfig' is set to 'nonCodebook', the UE is configured for non-codebook based transmission. When the higher layer parameter 'txConfig' is not configured, the UE does not expect scheduling by DCI format 0_1. When the PUSCH is scheduled according to DCI format 0_0, PUSCH transmission is based on a single antenna port.

In the case of codebook-based transmission, the PUSCH may be scheduled by DCI format 0_0 or DCI format 0_1, or scheduled semi-statically. When the PUSCH is scheduled by DCI format 0_1, the UE determines the PUSCH transmission precoder based on the SRI, transmit precoding matrix indicator (TPMI) and transmission rank from the DCI, as given by the SRS resource indicator field and the precoding information and number of layers field. The TPMI is used to indicate a precoder to be applied across antenna ports, and corresponds to an SRS resource selected by the SRI when multiple SRS resources are configured. Alternatively, when a single SRS resource is configured, the TPMI is used to indicate a precoder to be applied across antenna ports, and corresponds to the single SRS resource. A transmission precoder is selected from the UL codebook having the same number of antenna ports as the higher layer parameter 'nrofSRS-Ports'. When the higher layer in which the UE is set to 'codebook' is configured with the parameter 'txConfig', at least one SRS resource is configured for the UE. The SRI indicated in slot n is associated with the most recent transmission of the SRS resource identified by the SRI, where the SRS resource precedes the PDCCH carrying the SRI (i.e., slot n).

ii) In the case of non-codebook-based transmission, the PUSCH may be scheduled by DCI format 0_0 or DCI format 0_1, or scheduled semi-statically. When multiple SRS resources are configured, the UE may determine the PUSCH precoder and transmission rank based on the wideband SRI. Here, the SRI is given by the SRS resource indicator in the DCI or by the higher layer parameter 'srs-ResourceIndicator'. The UE may use one or multiple SRS resources for SRS transmission. Here, the number of SRS resources may be configured for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based UL transmission is 4. The SRI indicated in slot n is associated with the most recent transmission of the SRS resource identified by the SRI, where the SRS transmission precedes the PDCCH carrying the SRI (i.e., slot n).

1.3. Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

UL BM Process

In UL BM, reciprocity (or beam correspondence) between a Tx beam and an Rx beam may or may not be established depending on UE implementation. When the Tx beam-Rx beam reciprocity is established for both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

The UL BM process may be divided into a UE's Tx beam sweeping and a BS's Rx beam sweeping.

Figure 5:
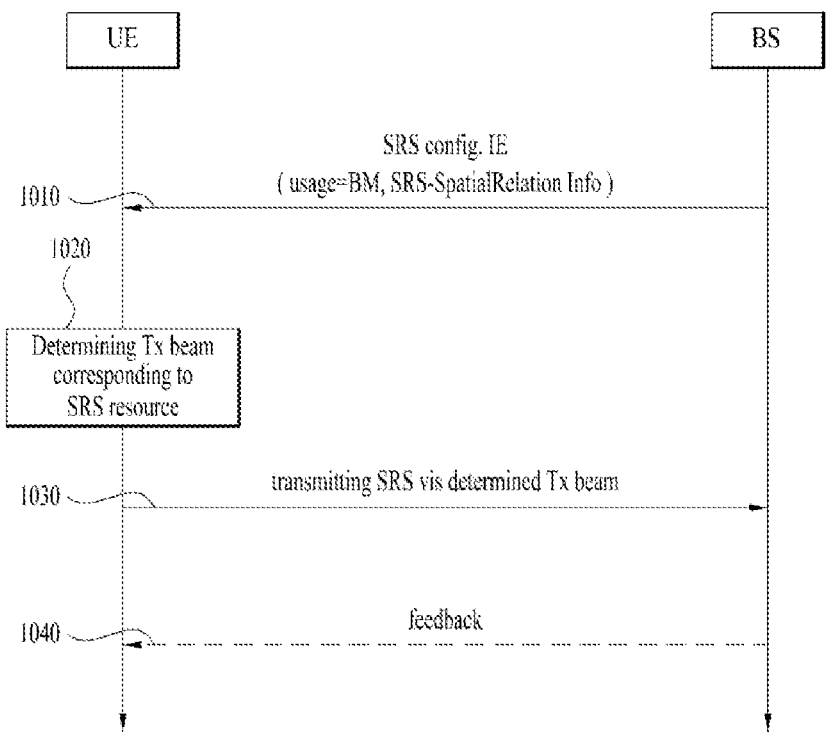
FIG. 5 is a diagram illustrating a signal flow for an exemplary UL BM process using an SRS, which is applicable to various embodiments.

FIG. 5 is a diagram illustrating a signal flow for an exemplary UL BM process using an SRS, which is applicable to various embodiments.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationlnfo is configured for an SRS resource, the same beamforming as used for the SSB, the CSI-RS, or the SRS is applied for transmission. However, if SRS-SpatialRelationlnfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationlnfo is set to 'SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationlnfo is set to 'CSI-RS,' the UE transmits the SRS by applying the same spatial domain transmission filter used for reception of the CSI-RS; or iii) if SRS-SpatialRelationlnfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

1.4. Uplink Power Control

In wireless communication systems, it may be necessary to increase or decrease the transmission power of a UE and/or a mobile device depending on situations. Controlling the transmission power of the UE and/or mobile device may be referred to as UL power control. For example, transmission power control may be applied to satisfy requirements (e.g., signal-to-noise ratio (SNR), bit error ratio (BER), block error ratio (BLER), etc.) of a BS (e.g., gNB, eNB, etc.).

The above-described power control may be performed according to an open-loop power control method and a closed-loop power control method.

Specifically, the open-loop power control method refers to a method of controlling transmission power without feedback from a transmitting device (e.g., BS, etc.) to a receiving device (e.g., UE, etc.) and/or feedback from the receiving device to the transmitting device. For example, the UE may receive a specific channel/signal (pilot channel/signal) from the BS and estimate the strength of received power based on the received channel/signal. Then, the UE may control the transmission power based on the strength of the estimated received power.

On the other hand, the closed-loop power control method refers to a method of controlling transmission power based on feedback from a transmitting device to a receiving device and/or feedback from the receiving device to the transmitting device. For example, the BS receives a specific channel/signal from the UE and determines an optimal power level of the UE based on a power level, SNR, BER, BLER, etc. which are measured based on the received specific channel/signal. The BS may transmit information (i.e., feedback) on the determined optimal power level to the UE on a control channel, and the UE may control the transmission power based on the feedback provided by the BS.

Hereinafter, power control methods for cases in which a UE and/or a mobile device perform UL transmission to a BS in a wireless communication system will be described in detail. Specifically, power control methods for transmission of: 1) a UL data channel (e.g., PUSCH); 2) a UL control channel (e.g., PUCCH); 3) an SRS; and/or 4) a random access channel (e.g., PRACH) will be described. In this case, a transmission occasion (i.e., transmission time unit) (i) for the PUSCH, PUCCH, SRS and/or PRACH may be defined by a slot index (n_s) in a frame with a system frame number (SFN), a first symbol (S) in a slot, the number of consecutive symbols (L), and the like.

1.4.1. Power Control of UL Data Channel

Regarding power control of a UL data channel, a power control method will be described based on a case in which the UE performs PUSCH transmission, for convenience of description. However, the power control method is not limited to the PUSCH transmission, that is, the power control method may be extended and applied to other UL data channels supported in wireless communication systems.

For PUSCH transmission in an active UL bandwidth part (BWP) of a carrier (f) of a serving cell (c), the UE may calculate a linear power value of transmission power determined by Equation 1 below. Thereafter, the corresponding UE may control the transmission power by taking the calculated linear power value into consideration for the number of antenna ports and/or the number of SRS ports.

In particular, if the UE performs PUSCH transmission in the active UL BWP (b) of the carrier (f) of the serving cell (c) using a parameter set configuration based on index j and a PUSCH power control adjustment state based on index l, the UE may determine PUSCH transmission power $P_{PUSCH,b,f,c}(i, j, q_d, l)$ (dBm) on a PUSCH transmission occasion (i) based on Equation 1 below.

[Equation 1]

$$P_{PUSCH,b,f,c}(i, j, q_d, l) = \min \begin{cases} P_{CMAX,f,c}(i), \\ P_{O\_PUSCH,b,f,c}(j) + 10 \log_{10}\left(2^{\mu} \cdot M_{RB,b,f,c}^{PUSCH}(i)\right) + \alpha_{b,f,c}(j) \cdot \\ PL_{b,f,c}(q_d) + \Delta_{TF,b,f,c}(i) + f_{b,f,c}(i, l) \end{cases}$$

In Equation 1, index j denotes the index for an open-loop power control parameter (e.g., P_o, alpha (α), etc.), and a maximum of 32 parameter sets may be configured for each cell. Index q_d denotes the index of a DL RS resource for path loss (PL) measurement (e.g., $PL_{b, f, c}(q_d)$), and a maximum of four measurements may be configured for each cell. Index l denotes the index of a closed-loop power control process, and a maximum of two processes may be configured for each cell.

In addition, P_o (e.g., $P_{O\_PUSCH, b, f, c}(j)$) is a parameter broadcast as part of system information and may denote target received power of a receiver. The corresponding P_o value may be configured in consideration of UE throughput, cell capacity, noise and/or interference. Alpha (e.g., $\alpha_{b, f, c}(j)$) may denote a rate for compensating for PL. Alpha may have a value from 0 to 1, and full path loss compensation or fractional path loss compensation may be performed according to the configured value. In this case, the alpha value may be configured in consideration of interference between UEs and/or data rates. In addition, $P_{CMAX, f, c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. $M_{RB,b,f,c}^{PUSCH}(i)$ may denote a PUSCH resource allocation bandwidth, which is expressed by the number of resource blocks (RBs) in the PUSCH transmission occasion based on an SCS (μ). $f_{b, f, c}(i,l)$, which is related to PUSCH power control adjustment states, may be configured or indicated based on a TPC command field of DCI (e.g., DCI format 0_0, DCI format 0_1, DCI format 2_2, DCI format2_3, etc.).

In this case, a specific radio resource control (RRC) parameter (e.g., SRI-PUSCHPowerControl-Mapping, etc.) may indicate a linkage relationship between an SRS resource indicator (SRI) field of the DCI and the aforementioned indices: j, q_d, and l. In other words, the above-mentioned indices j, l, and q_d may be associated with a beam, a panel, and/or a spatial domain transmission filter based on specific information. Therefore, PUSCH transmission power control may be performed at the level of beams, panels, and/or spatial domain transmission filters.

The above-described parameters and/or information for PUSCH power control may be configured separately (independently) for each BWP. In this case, the corresponding parameters and/or information may be configured or indicated by higher layer signaling (RRC signaling, medium access control-control element (MAC-CE), etc.) and/or DCI. For example, the parameters and/or information for PUSCH power control may be provided by RRC signaling such as PUSCH-ConfigCommon, PUSCH-PowerControl, etc. The configurations of PUSCH-ConfigCommon and PUSCH-PowerControl may be defined as follows, and a detailed definition of each parameter may be found in 3GPP TS Rel.16 38.331.

```
PUSCH-ConfigCommon ::=                      SEQUENCE {
    groupHoppingEnabledTransformPrecoding   ENUMERATED {enabled}
OPTIONAL,  -- Need R
    pusch-TimeDomainAllocationList:         PUSCH-
TimeDomainResourceAllocationList
OPTIONAL,  -- Need R
    msg3-DeltaPreamble                      INTEGER (-1..6)
OPTIONAL,  -- Need R
    p0-NominalWithGrant                     INTEGER (-202..24)
OPTIONAL,  -- Need R
    ...
}
PUSCH-PowerControl ::=                      SEQUENCE {
    tpc-Accumulation                        ENUMERATED { disabled }
OPTIONAL, -- Need S
    msg3-Alpha                              Alpha
OPTIONAL, -- Need S
    p0-NominalWithoutGrant                  INTEGER (-202..24)
OPTIONAL, -- Need M
    p0-AlphaSets                            SEQUENCE (SIZE (1..maxNrofP0-
PUSCH-AlphaSets)) OF P0-PUSCH-AlphaSet         OPTIONAL, -- Need M
    pathlossReferenceRSToAddModList         SEQUENCE (SIZE
(1..maxNrofPUSCH-PathlossReferenceRSs)) OF PUSCH-PathlossReferenceRS))
    OPTIONAL, -- Need N
    pathlossReferenceRSToReleaseList        SEQUENCE (SIZE
(1..maxNrofPUSCH-PathlossReferenceRSs)) OF PUSCH-PathlossReferenceRSs))
    OPTIONAL,  -- Need N
    twoPUSCH-PC-AdjustmentStates            ENUMERAT ED {two States}
OPTIONAL, -- Need S
    deltaMCS                                ENUMERATED {enabled}
OPTIONAL, -- Need S
    sri-PUSCH-MappingToAddModList           SEQUENCE (SIZE
(1..maxNrofSRI-PUSCH-Mappings)) OF SRI-PUSCH-PowerControl
    OPTIONAL, -- Need N
    sri-PUSCH-MappingToReleaseList          SEQUENCE (SIZE (1..maxNrofSRI-
PUSCH-Mappings)) OF SRI-PUSCH -PowerControlId
    OPTIONAL   -- Need N
}
```

The UE may determine or calculate the PUSCH transmission power according to the above-described method and transmit the PUSCH based on the determined or calculated PUSCH transmission power.

1.4.2. Power Control of UL Control Channel

Regarding power control of a UL control channel, a power control method will be described based on a case in which the UE performs PUCCH transmission, for convenience of description. However, the power control method is not limited to the PUCCH transmission, that is, the power control method may be extended and applied to other UL control channels supported in wireless communication systems.

If the UE performs PUCCH transmission in an active UL BWP (b) of a carrier (f) of a primary cell (or secondary cell) (c) using a PUCCH power control adjustment state based on index 1, the UE may determine PUCCH transmission power $P_{PUCCH,\ b,\ f,\ c}(i, q_u, q_d, l)$ (dBm) on a PUCCH transmission occasion (i) based on Equation 2 below.

ment (e.g., $PL_{b,\ f,\ c}(q_d)$), and a maximum of four measurements may be configured for each cell. Index 1 denotes the index of a closed-loop power control process, and a maximum of two processes may be configured for each cell.

In addition, P_o (e.g., $P_{O\_PUCCH,\ b,\ f,\ c}(q_u)$) is a parameter broadcast as part of system information and may denote target received power of a receiver. The corresponding P_o value may be configured in consideration of UE throughput, cell capacity, noise and/or interference. In addition, $P_{CMAX,\ f,\ c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. $M_{RB,\ b,\ f,\ c}^{PUCCH}(i)$ may denote a PUCCH resource allocation bandwidth, which is expressed by the number of RBs in the PUCCH transmission occasion based on an SCS (μ) Delta functions (e.g., $\Delta_{F\_PUCCH}(F)$, $\Delta_{TF,\ b,\ f,\ c}(i)$, etc.) may be configured in consideration of PUCCH formats 0, 1, 2, 3, 4, etc.). $g_{b,\ f,\ c}(i,l)$, which is

[Equation 2]

$$P_{PUCCH,b,f,c}(i, q_u, q_d, l) = \min \left\{ \begin{array}{l} P_{CMAX,f,c}(i), \\ P_{O\_PUCCH,b,f,c}(q_u) + 10 \log_{10}\left(2^\mu \cdot M_{RB,b,f,c}^{PUCCH}(i)\right) + PL_{b,f,c}(q_d) + \\ \Delta_{F\_PUCCH}(F) + \Delta_{TF,b,f,c}(i) + g_{b,f,c}(i, l) \end{array} \right\}$$

In Equation 2, q_u denotes the index of an open-loop power control parameter (e.g., P_o, etc.), and a maximum of 8 parameter values may be configured for each cell. Index q_d denotes the index of a DL RS resource for PL measure-related to PUCCH power control adjustment states, may be configured or indicated based on a TPC command field of DCI received or detected by the UE (e.g., DCI format 1_0, DCI format 1_1, DCI format 2_2, etc.).

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage relationship between PUCCH resources and the aforementioned indices q_u, q_d, and l. For example, the PUCCH spatial relation Activation/Deactivation command of the MAC-CE may activate or deactivate the linkage relationship between the PUCCH resources and the aforementioned indices q_u, q_d, and l based on the RRC parameter PUCCH-SpatialRelationInfo. In other words, the above-described indices q_u, q_d, and l may be associated with a beam, a panel, and/or a spatial domain transmission filter based on specific information. Therefore, PUCCH transmission power control may be performed at the level of beams, panels, and/or spatial domain transmission filters.

The above-described parameters and/or information for PUCCH power control may be configured separately (independently) for each BWP. In this case, the corresponding parameters and/or information may be configured or indicated by higher layer signaling (RRC signaling, MAC-CE, etc.) and/or DCI. For example, the parameters and/or information for PUCCH power control may be provided by RRC signaling such as PUCCH-ConfigCommon, PUCCH-PowerControl, etc. The configurations of PUCCH-ConfigCommon and PUCCH-PowerControl may be defined as follows, and a detailed definition of each parameter may be found in 3 GPP TS Rel.16 38.331.

The UE may determine or calculate the PUCCH transmission power according to the above-described method and transmit the PUCCH based on the determined or calculated PUCCH transmission power.

1.4.3. Power Control of SRS

In relation to SRS transmission in an active UL BWP of a carrier (f) of a serving cell (c), the UE may calculate a linear power value of transmission power determined by Equation 3 below. Thereafter, the UE may control the transmission power by equally dividing the calculated linear power value over antenna port(s) configured for the SRS.

Specifically, when the UE performs SRS transmission in an active UL BWP (b) of the carrier (f) of the serving cell (c) using an SRS power control adjustment state based on index l, the UE may determine SRS transmission power $P_{SRS,b,f,c}(i, q_s, l)$ (dBm) on an SRS transmission occasion (i) based on Equation 3 below.

[Equation 3]
$$P_{SRS,b,f,c}(i, q_s, l) = \min \begin{Bmatrix} P_{CMAX,f,c}(i) \\ P_{O\_SRS,b,f,c}(q_s) + 10 \log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix}$$

| | |
|---|---|
| PUCCH-ConfigCommon ::= | SEQUENCE { |
| pucch-ResourceCommon | INTEGER (0..15) |
| OPTIONAL, -- Cond InitialBWP-Only | |
| pucch-GroupHopping | ENUMERATED { neither, enable, disable }, |
| hoppingId | INTEGER (0..1023) |
| OPTIONAL, -- Need R | |
| p0-nominal | INTEGER (−202..24) |
| OPTIONAL, -- Need R | |
| ... | |
| } | |
| PUCCH-PowerControl ::= | SEQUENCE { |
| deltaF-PUCCH-f0 | INTEGER (−16..15) |
| OPTIONAL, -- Need R | |
| deltaF-PUCCH-f1 | INTEGER (−16..15) |
| OPTIONAL, -- Need R | |
| deltaF-PUCCH-f2 | INTEGER (−16..15) |
| OPTIONAL, -- Need R | |
| deltaF-PUCCH-f3 | INTEGER (−16..15) |
| OPTIONAL, -- Need R | |
| deltaF-PUCCH-f4 | INTEGER (−16..15) |
| OPTIONAL, -- Need R | |
| p0-Set (1..maxNrofPUCCH-P0-PerSet)) OF P0-PUCCH | SEQUENCE (SIZE OPTIONAL, -- Need M |
| pathlossReferenceRSs (1..maxNrofPUCCH-PathlossReferenceRSs)) OF PUCCH-PathlossReferenceRS OPTIONAL, -- Need M | SEQUENCE (SIZE |
| twoPUCCH-PC-AdjustmentStates OPTIONAL, -- Need S | ENUMERATED {twoStates} |
| ... | |
| } | |
| P0-PUCCH ::= | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id PathlossReferenceRS-Id, | PUCCH- |
| referenceSignal | CHOICE { |
| ssb-Index | SSB-Index, |
| csi-RS-Index | NZP-CSI-RS-ResourceId |
| } | |
| } | |

In Equation 3, q_s denotes the index of an open-loop power control parameter (e.g., P_o, alpha (α), a DL RS resource for a path loss (PL) measurement (e.g., $PL_{b,f,c}(q_d)$), etc.), which may be configured for SRS resource set. Index 1 denotes the index of a closed-loop power control process, and the corresponding index may be configured independently of a PUSCH or configured in relation to the PUSCH. If SRS power control is not related to the PUSCH, the maximum number of closed-loop power control processes for the SRS may be 1.

In addition, P_o (e.g., $P_{O\_SRS,b,f,c}(q_s)$) is a parameter broadcast as part of system information and may denote target received power of the receiver. The corresponding P_o value may be configured in consideration of UE throughput, cell capacity, noise and/or interference, etc. Alpha (e.g., $\alpha_{SRS,b,f,c}(q_s)$) may denote a rate for compensating for PL. Alpha may have a value from 0 to 1, and full path loss compensation or fractional path loss compensation may be performed according to the configured value. In this case, the alpha value may be configured in consideration of interference between UEs and/or data rates. In addition, $P_{CMAX,f,c}(i)$ may denote configured UE transmission power. For example, the configured UE transmission power may be interpreted as 'configured maximum UE output power' defined in 3GPP TS 38.101-1 and/or TS 38.101-2.

$M_{SRS,b,f,c}(i)$ may denote an SRS resource allocation bandwidth, which is expressed by the number of RBs in the SRS transmission occasion based on an SCS (μ). In addition, $h_{b,f,c}(i,l)$, which is related to SRS power control adjustment states, may be configured or indicated based on a TPC command field of DCI received or detected by the UE (e.g., DCI format 2_3, etc.) and/or an RRC parameter (e.g., srs-PowerControlAdjustmentStates, etc.).

A resource for SRS transmission may be applied as a reference for the BS and/or UE to determine a beam, a panel, and/or a spatial domain transmission filter. Thus, SRS transmission power control may be performed in units of beams, panels, and/or spatial domain transmission filters.

The above-described parameters and/or information for SRS power control may be configured separately (independently) for each BWP. In this case, the corresponding parameters and/or information may be configured or indicated by higher layer signaling (e.g., RRC signaling, MAC-CE, etc.) and/or DCI. For example, the parameters and/or information for SRS power control may be provided by RRC signaling such as SRS-Config, SRS-TPC-Command-Config, etc. Table 5 below shows the configurations of SRS-Config and SRS-TPC-CommandConfig. The definition and details of each parameter may be found in 3GPP TS Rel.16 38.331.

```
SRS-Config ::=                                    SEQUENCE {
  srs-ResourceSetToReleaseList                    SEQUENCE
    (SIZE(1..maxNrofSRS-ResourceSets)) OF SRS-ResourceSetId      OPTIONAL, -
    - Need N
  srs-ResourceSetToAddModList                     SEQUENCE
    (SIZE(1..maxNrofSRS-BesourceSets)) OF SRS-ResourceSet        OPTIONAL, -
    - Need N
  srs-ResourceToReleaseList                       SEQUENCE
    (SIZE(1..maxNrofSRS-Resources)) OF SRS-ResourceId            OPTIONAL,
    -- Need N
  srs-ResourceToAddModList                        SEQUENCE
    (SIZE(1..maxNrofSRS-Resources)) OF SRS-Resource              OPTIONAL,
    -- Need N
  tpc-Accumulation                                ENUMERATED {disabled}
    OPTIONAL,  -- Need S
  ...,
  SRS-ResourceSet ::=                             SEQUENCE {
  srs-ResourceSetId                               SRS-ResourceSetId,
  srs-ResourceIdList                              SEQUENCE
    (SIZE(1..maxNrofSRS-ResourcesPerSet)) OF SRS-ResourceId      OPTIONAL, --
    Cond Setup
  resourceType                                    CHOICE {
    aperiodic                                     SEQUENCE {
      aperiodicSRS-ResourceTrigger                INTEGER (1..maxNrofSRS-
    TriggerStates-1),
      csi-RS                                      NZP-CSI-RS-ResourceId
    OPTIONAL, -- Cond NonCodebook
      slotOffset                                  INTEGER (1..32)
    OPTIONAL, -- Need S
      ...,
      [[
      aperiodicSRS-ResourceTriggerList            SEQUENCE
        (SIZE(1..maxNrofSRS-TriggerStates-2))
        OF INTEGER (1..maxNrofSRS-TriggerStates-1)               OPTIONAL  -- NeedM
      ]]
    },
    semi-persistent                               SEQUENCE {
      associatedCSI-RS                            NZP-CSI-RS-ResourceId
    OPTIONAL, -- Cond NonCodebook
      ...
    },
    periodic                                      SEQUENCE {
      associatedCSI-RS                            NZP-CSI-RS-ResourceId
    OPTIONAL, -- Cond NonCodebook
      ...
    }
  },
```

```
  usage                                ENUMERATED
{beamManagement, codebook, nonCodebook, antennaSwitching},
  alpha                                Alpha
OPTIONAL, -- Need S
  p0                                   INTEGER (-202..24)
OPTIONAL, -- Cond Setup
  pathlossReferenceRS                  PathlossReferenceRS-Config
OPTIONAL, -- Need M
  srs-PowerControlAdjustmentStates     ENUMERATED { sameAsFci2,
separateClosedLoop}                    OPTIONAL, -- Need S
  ...,
  [[
  pathlossReferenceRS-List-r16         SEQUENCE
SIZE(1..maxNrofSRS-PathlossReferenceRS-r16-1)) OF PathlossReferenceRS-
Config
    OPTIONAL   -- Need M
  ]]
}
PathlossReterenceRS-Config ::=         CHOICE {
  ssb-Index                            SSB-Index,
  csi-RS-Index                         NZP-CSI-RS-ResourceId
}
SRS-PosResourceSet-r16 ::=             SEQUENCE {
  srs-PosResourceSetId-r16             SRS-PosResourceSetId-
r16,
  srs-PosResourceIdList-r16            SEQUENCE
(SIZE(1..maxNrofSRS-ResourcesPerSet)) OF SRS-PosResourceId-r16
    OPTIONAL, -- Cond Setup
  resourceType-r16                     CHOICE {
    aperiodic-r16                      SEQUENCE {
    aperiodicSRS-ResourceTriggerList-r16  SEQUENCE
(SIZB(1..maxNrofSRS-TriggerStates-1))
    OF INTEGER (1..maxNrofSRS-TriggerStates-1) OPTIONAL, -- Need M
    slotOffset-r16                     INTEGER (1..32)
OPTIONAL, -- Need S
    ...
    },
    semi-persistent-r16                SEQUENCE {
    ...
    },
    periodic-r16                       SEQUENCE {
    ...
    }
  },
  alpha-r16                            Alpha
OPTIONAL, -- Need S
  p0-r16                               INTEGER (-202..24)
OPTIONAL, -- Cond Setup
  pathlossReferenceRS-Pos-r16          CHOICE {
    ssb-Index-16                       SSB-Index,
    csi-RS-Index-r16                   NZP-CSI-RS-ResourceId,
    ssb-r16                            SSB-InfoNcell-r16,
    dl-PRS-r16                         DL-PRS-Info-r16
  }
OPTIONAL, -- Need M
  ...
}
SRS-TPC-CommandConfig ::=              SEQUENCE {
  startingBitOfFormat2-3               INTEGER (1..31)
OPTIONAL,   -- Need R
  fieldTypeFormat2-3                   INTEGER (0..1)
OPTIONAL,   -- Need R
  ...,
  [[
  startingBitOfFormat2-3SUL            INTEGER (1..31)
OPTIONAL   -- Need R
  ]]
}
```

The UE may determine or calculate the SRS transmission power according to the above-described method and transmit the SRS based on the determined or calculated SRS transmission power.

1.4.4. Power Control of Random Access Channel

When the UE performs PRACH transmission in an active UL BWP (b) of a carrier (f) of a serving cell (c), the UE may determine PRACH transmission power $P_{PRACH, b, f, c}(i)$ (dBm) on a PRACH transmission occasion (i) based on Equation 4 below.

$$P_{PRACH,b,f,c}(i) = \min\{P_{CMAX,f,c}(i), P_{PRACH, target,f,c} + PL_{b,f,c}\} \quad [\text{Equation 4}]$$

In Equation 4, $P_{CMAX, f, c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. In addition, $P_{PRACH, target, f, c}$ denotes PRACH target reception power provided through higher layer signaling (e.g., RRC signaling, MAC-CE, etc.) for the active UL BWP. $PL_{b, f, c}$ denotes PL for the active UL BWP, which may be determined based on a DL RS related to PRACH transmission in the active DL BWP of the serving cell (c). For example, the UE may determine PL related to PRACH transmission based on a synchronization signal/physical broadcast channel (SS/PBCH) block related to the PRACH transmission.

The above-described parameters and/or information for PRACH power control may be configured separately (independently) for each BWP. In this case, the corresponding parameters and/or information may be configured or indicated by higher layer signaling (RRC signaling, MAC-CE, etc.) and/or DCI. For example, the parameters and/or information for PRACH power control may be provided by RRC signaling such as RACH-ConfigGeneric, etc. The configuration of RACH-ConfigGeneric may be defined as follows, and a detailed definition of each parameter may be found in 3GPP TS Rel.16 38.331.

```
RACH-ConfigGeneric ::=        SEQUENCE {
  prach-ConfigurationIndex      INTEGER (0..255),
  msg1-FDM                      ENUMERATED {one,
two, four, eight},
  msg1-FrequencyStart           INTEGER
(0..maxNrofPhysicalResourceBlocks-1),
  zeroCorrelationZoneConfig     INTEGER(0..15),
  preambleReceivedTargetPower   INTEGER (-202..-60),
  preambleTransMax              ENUMERATED (n3, n4,
n5, n6, n7 n8, n10, n20, n50, n100, n200},
  powerRampingStep              ENUMERATED [dB0,
dB2, dB4, dB6),
  ra-ResponseWindow             ENUMERATED (sl1, sl2,
sl4, sl8, sl10, sl20, S140, sl80},
  ...,
  [[
  ra-ResponseWindow-r16         ENUMERATED {sl1, sl2,
sl4, sl8, sl10, sl20, sl40, sl60, sl80, sl160} OPTIONAL, -- Need R
  prach-ConfigurationIndex-v16xy  INTEGER (256..262)
OPTIONAL  -- Need R
  ]]
}
```

The UE may determine or calculate the PRACH transmission power according to the above-described method and transmit the PRACH based on the determined or calculated PRACH transmission power.

1.3.5. Priorities for Transmission Power Control

Hereinafter, a method of controlling the transmission power of a UE will be described in consideration of single cell operation in a carrier aggregation environment or single cell operation in multi-UL carrier (e.g., two carriers) environment.

In this case, if the total UE transmission (or transmit) power of UL transmissions (e.g., PUSCH, PUCCH, SRS, and PRACH transmissions described above in (1) to (4)) on transmission occasions (i) exceeds the linear value of configured UE transmission (or transmit) power (e.g., $\hat{P}_{CMAC}(i)$) the UE may be configured to allocate UL transmission power according to priorities (priority order). For example, the configured UE transmission (or transmit) power may mean 'configured maximum UE output power' (e.g., $P_{CMAC}(i)$) defined in 3GPP TS 38.101-1 and/or TS 38.101-2.

In this case, the priorities for transmission power control may be configured or defined in the following order.

PRACH transmission on Primary Cell (PCell)

PUCCH for hybrid automatic repeat and request-acknowledgement (HARQ-ACK) information and/or scheduling request (SR) or PUSCH for HARQ-ACK information PUCCH or PUSCH for channel state information (CSI)

PUSCH for neither HARQ-ACK information nor CSI

SRS transmission or PRACH transmission in serving cell other than PCell (however, an aperiodic SRS has a higher priority than a semi-persistent SRS and/or periodic SRS)

The UE may control the total transmission power to be less than or equal to the linear value of the configured UE transmission (or transmit) power in each symbol of the transmission occasion (i) based on the power allocation according to the priority order as described above. For example, to this end, the UE may be configured to scale and/or drop the power of UL transmission with a low priority. In this case, details of scaling and/or dropping may be configured or defined according to UE implementation.

As a particular example, for transmissions with the same priority in carrier aggregation, the UE may assume that transmission in a Pcell has a higher priority than transmission in a secondary cell (Scell). Additionally/alternatively, for transmissions with the same priority in multiple UL carriers (e.g., two UL carriers), the UE may assume a carrier on which PUCCH transmission is configured to have a high priority. In addition, if PUCCH transmission is not configured on any carriers, the UE may assume that transmission on a non-supplementary UL carrier has a high priority.

1.4.6. Transmission Power Control Procedure

Figure 6:
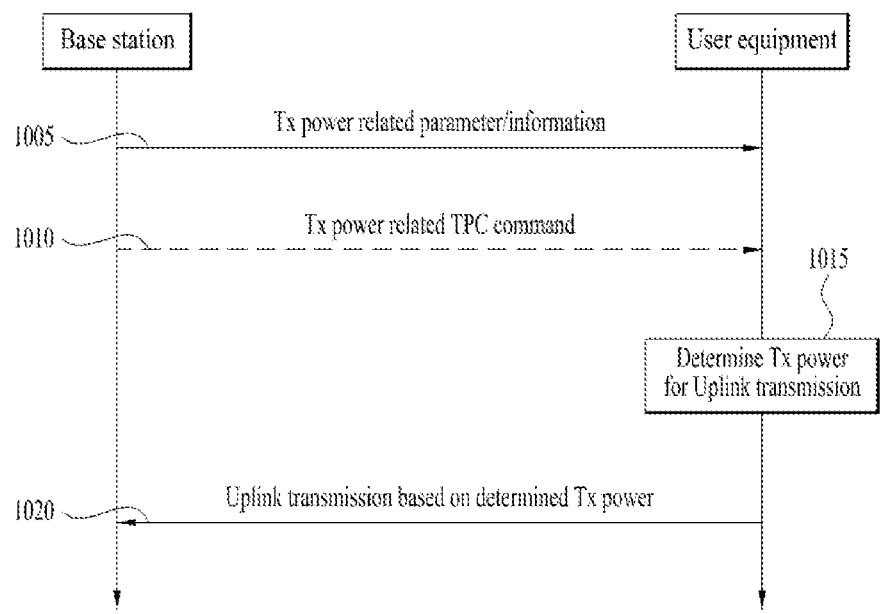
FIG. 6 is a diagram illustrating an exemplary procedure for controlling UL transmission power to which various embodiments are applicable.

FIG. 6 is a diagram illustrating an exemplary procedure for controlling UL transmission power to which various embodiments are applicable.

First, a UE may receive parameters and/or information related to transmission power (Tx power) from a BS (1005). In this case, the UE may receive the corresponding parameters and/or information through higher layer signaling (e.g., RRC signaling, MAC-CE, etc.). For example, for PUSCH transmission, PUCCH transmission, SRS transmission, and/or PRACH transmission, the UE may receive the above-described parameters and/or information related to transmission power control.

The UE may receive a TPC command related to transmission power from the BS (1010). In this case, the UE may receive the corresponding TPC command through lower layer signaling (e.g., DCI). For example, for PUSCH transmission, PUCCH transmission, and/or SRS transmission, the UE may receive information on a TPC command to be used for determining a power control adjustment state, etc. in a TPC command field of a predefined DCI format as described above. However, the corresponding step may be omitted in PRACH transmission.

The UE may determine (or calculate) transmission power for UL transmission based on the parameters, information, and/or TPC command received from the BS (1015). For example, the UE may determine PUSCH transmission power, PUCCH transmission power, SRS transmission power, and/or PRACH transmission power according to the above-described methods (e.g., Equations 1 to 4, etc.). Additionally/alternatively, when two or more UL channels and/or signals need to be transmitted together as in carrier aggregation, the UE may determine the transmission power for UL transmission in consideration of the above-described priorities.

The UE may perform transmission of one or more UL channels and/or signals (e.g., PUSCH, PUCCH, SRS, PRACH, etc.) to the BS based on the determined (or calculated) transmission power (1020).

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 7:
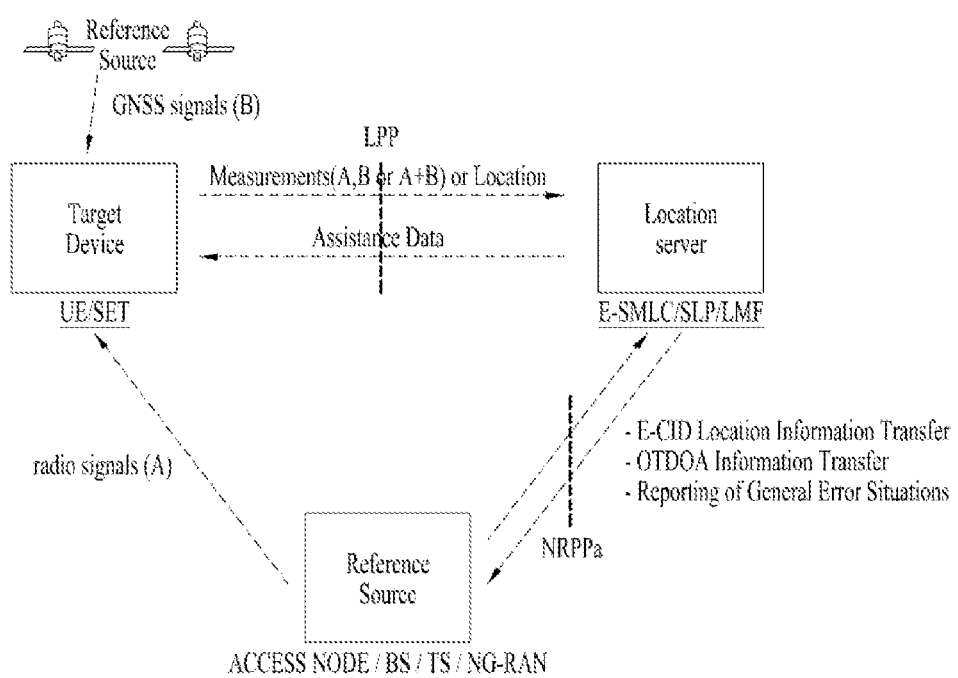
FIG. 7 is a diagram illustrating a positioning protocol configuration for positioning a user equipment (UE), to which various embodiments are applicable.

FIG. 7 is a diagram illustrating an exemplary positioning protocol configuration for positioning a UE, to which various embodiments are applicable.

Referring to FIG. 7, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0,1, ... ) may be defined by Equation 5.

$$r(m) = \frac{1}{\sqrt{2}}(1 - 2c(m)) + j\frac{1}{\sqrt{2}}(1 - 2c(m+1))$$ [Equation 5]

c(i) may be a pseudo-random sequence. A pseudo-random sequence generator may be initialized by Equation 6.

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\right.$$
$$\left.(2(n_{ID,seq}^{PRS} \bmod 1024) + 1) + (n_{ID,seq}^{PRS} \bmod 1024)\right) \bmod 2^{31}$$ [Equation 6]

$n_{s,f}^{\mu}$ may be a slot number in a frame in an SCS configuration $\mu$. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k, 1)_{p,\mu}$ specifically by Equation 7. $(k, 1)_{p,\mu}$ may represent an RE (k, l) for an antenna port p and the SCS configuration $\mu$.

$$a_{k,l}^{(p,\mu)} = \beta_{PRS}r(m)$$

$$m = 0, 1, \ldots$$

$$k = mK_{comb}^{PRS} + ((k_{offset}^{PRS} + k') \bmod K_{comb}^{PRS})$$

$$l = l_{start}^{PRS}, l_{start}^{PRS}+1, \ldots, l_{start}^{PRS}+L_{PRS}-1$$ [Equation 7]

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionIn-Burst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $L_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0,1, \ldots, K_{comb}^{PRS}-1\}$ may be given by combOffset. A frequency offset k' may be a function of $1-l_{start}^{PRS}$ as shown in Table 5.

TABLE 5

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 8.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \quad \text{[Equation 8]}$$
$$\{iT_{gap}^{PRS}\}_{i=0}^{T_{rep}^{PRS}-1}$$

$N_{slot}^{frame,\mu}$ may be the number of slots per frame in the SCS configuration µ. $n_f$ may be a system frame number (SFN). $n_{s,f}^{\mu}$ may be a slot number in the SCS configuration µ. A slot offset $T_{offset}^{PRS} \in \{0,1,\ldots,T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5,8,10,16,20,32,40,64,80, 160,320,640,1280,2560,5120,10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T^{muting}_{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture in NR System

Figure 8:
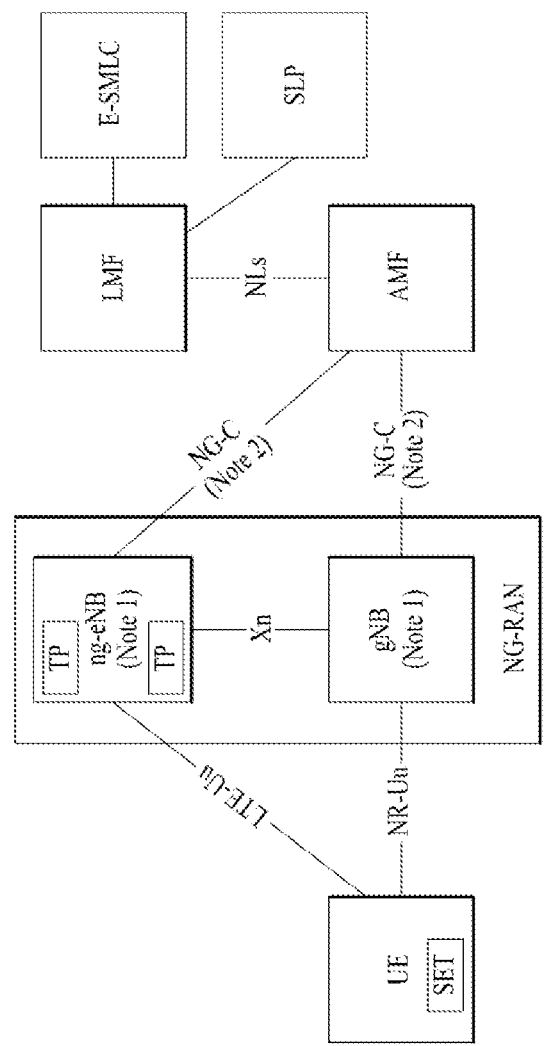
FIG. 8 illustrates architecture of a 5G system applicable to positioning of a UE connected to an NG-RAN or an E-UTRAN.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS -only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
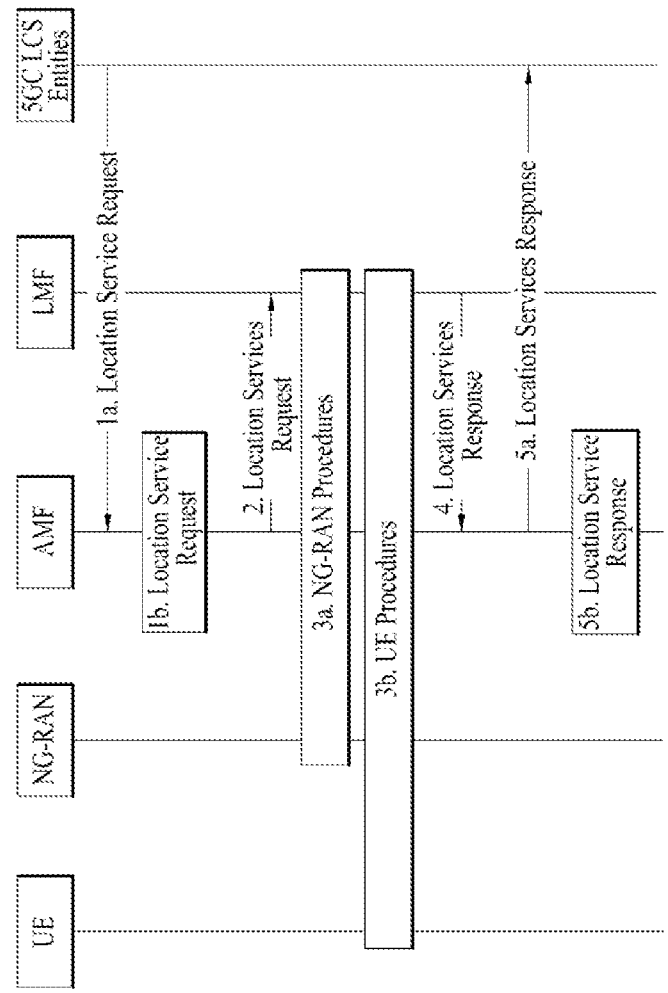
FIG. 9 illustrates an implementation example of a network for UE positioning.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 9 has been initiated by step 1*a*, the AMF may transfer the location service response to a 5GC entity such as a GMLC. If the procedure of FIG. 9 has been initiated by step 1*b*, the AMF may use the location service response in order to provide a location service related to an emergency call.

2.5. Positioning Protocol 2.5.1. LTE Positioning Protocol (LPP)

Figure 10:
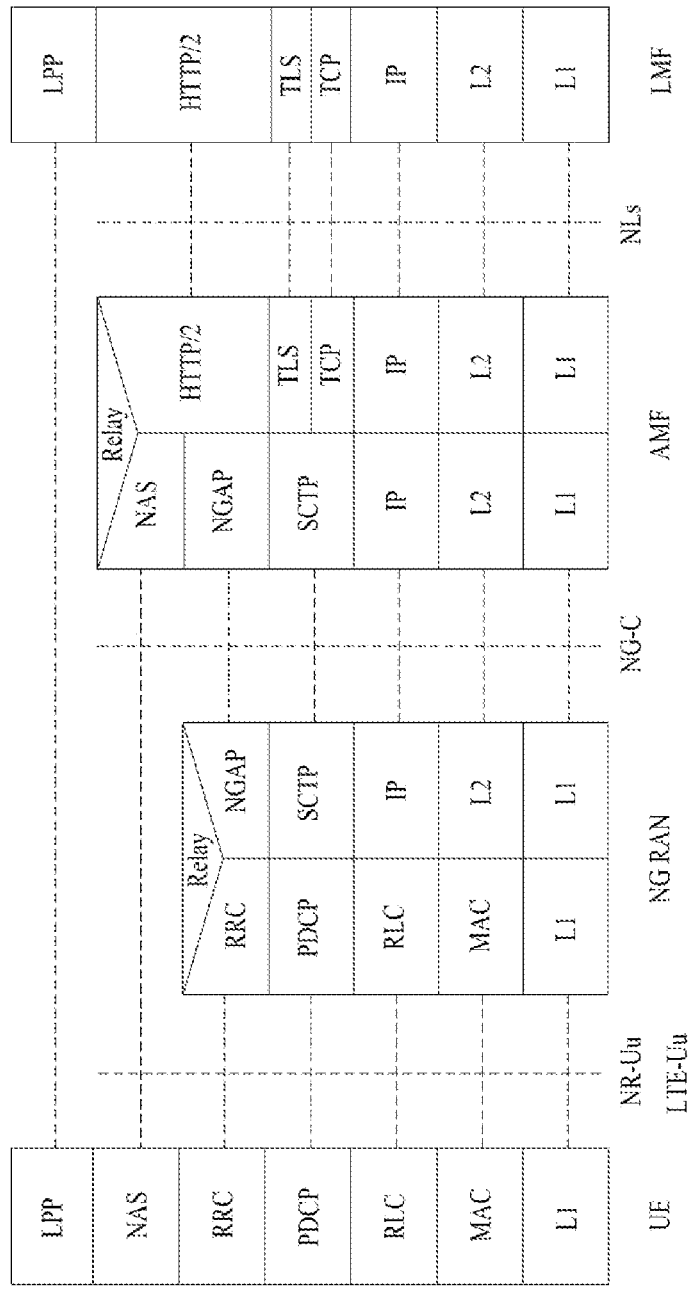
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

Figure 11:
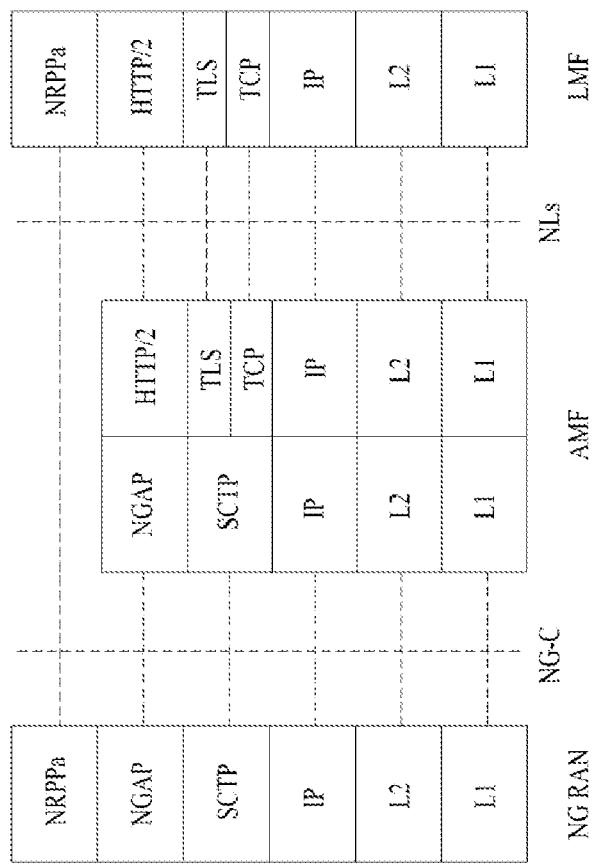
FIG. 11 is a diagram illustrating protocol layers for supporting NR positioning protocol a (NRPPa) protocol data unit (PDU) transmission, to which various embodiments are applicable.

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
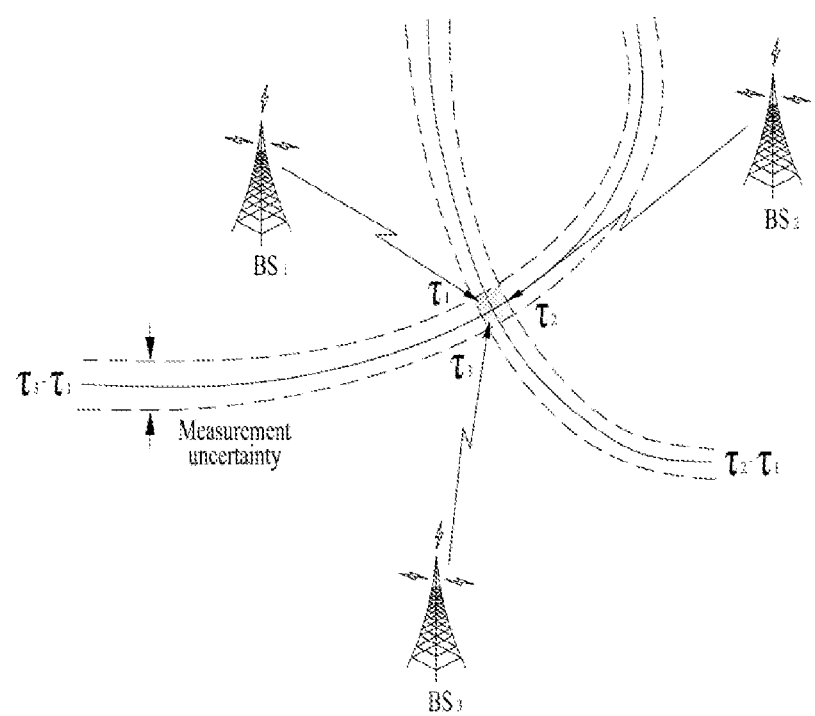
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 9 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 9]

In Equation 9, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2 =ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 13:
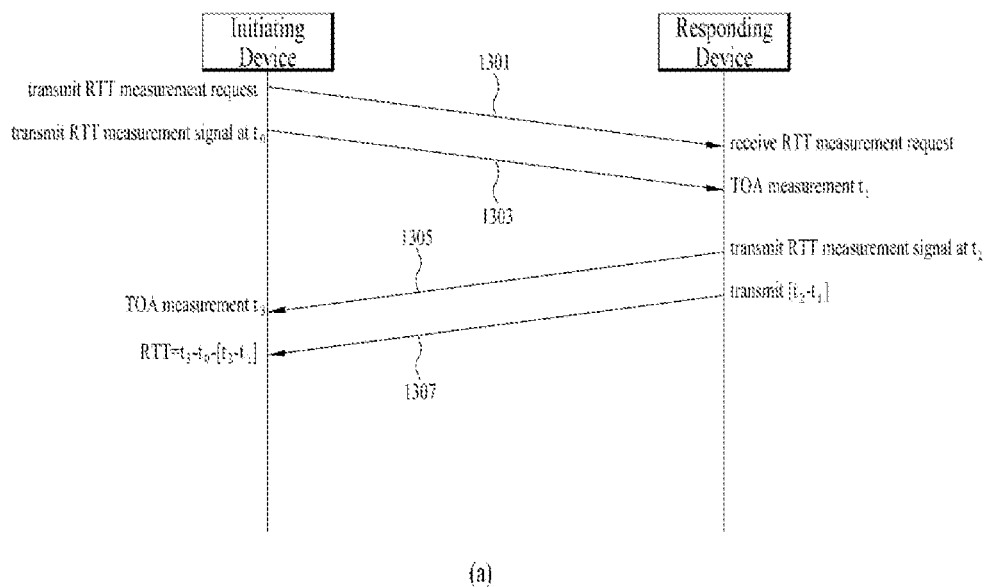
FIG. 13 is a diagram illustrating a multi-round trip time (multi-RTT) positioning method to which various embodiments are applicable.
Figure 13:
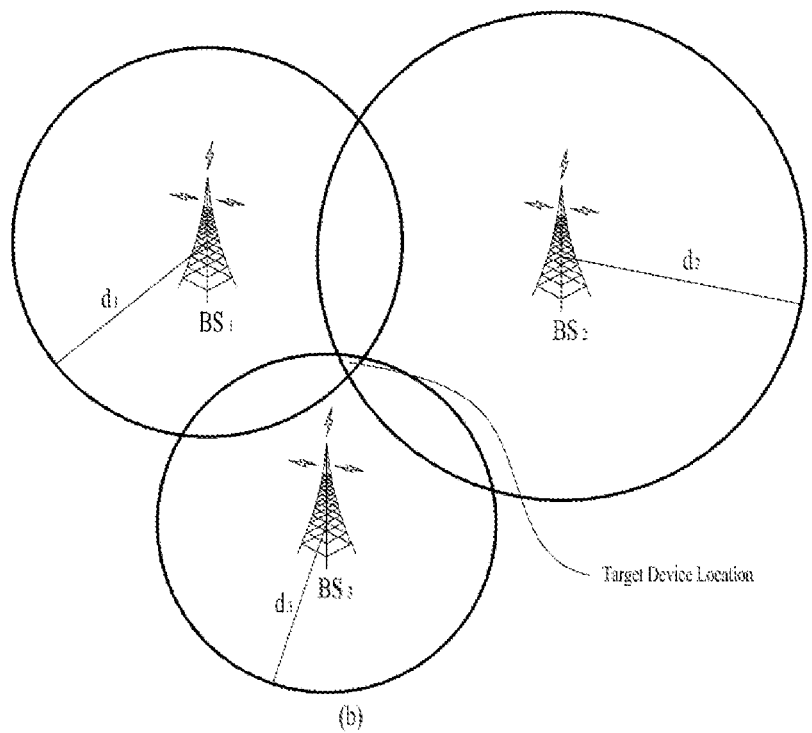

FIG. 13 is a diagram illustrating an exemplary multi-RTT positioning method to which various embodiments are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time $t_0$, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 10 below. The corresponding information may be transmitted and received by a separate signal or in the RTT measurement signal of operation 1705.

$$RTT = t_3 - t_0 - [t_2 - t_1] \quad \text{[Equation 10]}$$

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
CSI channel state information
CSI-RS: channel state information reference signal
LMF: location management function
RS: reference signal
RSRP: reference signal received power
RSRQ: reference signal received quality
SINR: signal to interference plus noise ratio
SNR: signal to noise ratio
SRS: sounding reference signal
SS: synchronization signal
SSB: synchronization signal block
SS/PBCH: synchronization signal/physical broadcast channel
TRP: transmission and reception point (TP: transmission point)

In the description of various embodiments of the present disclosure, the term BS is to be understood as an umbrella term including a remote radio head (RRH), eNB, gNB, TP, reception point (RP), relay, etc.

In the description of various embodiments of the present disclosure, an SRS resource set may be defined as a set of one or more SRS resources (i.e., a set of SRS resource). For example, each SRS resource may have an SRS resource identifier. For example, each SRS resource set may have an SRS resource set ID.

In the description of various embodiments of the present disclosure, when it is said that something is more than/more than or equal to A, it may be interpreted to mean that A is more than or equal to/more than A.

In the description of various embodiments of the present disclosure, when it is said that something is less than/less than or equal to B, it may be interpreted to mean that the thing is less than or equal to/less than B.

Various embodiments may be related to operation methods when failure occurs in detection of a DL RS for UL power control in a wireless communication system. Although the embodiments will be described based on an SRS (for positioning), the embodiments may also be applied to various UL RSs and/or UL signals. The embodiments may also be applied when a DL RS transmitted in a non-serving cell, which is set as spatial relation information, is not properly received.

Various embodiments may be related to control of the power of an SRS in consideration of a UE's serving cell and/or other cells (e.g., adjacent cell, neighbor cell, non-serving cell, etc.).

For example, considering that the UE transmits a specific SRS resource to a geographically distant neighbor cell/BS/TRP rather than the serving cell/BS/TRP, a DL RS resource transmitted from a specific neighbor cell/BS/TRP may be used as a PL reference. For example, such a UE operation may be of considerable importance in terms of transmission of a UL RS for UE positioning.

However, even if the UE transmits the SRS resource with the maximum available power (maximum power) due to the geographical distance from the UE (to a target cell/BS/TRP, etc.) (e.g., over a certain level) and/or the influence of the channel environment, the RSRP/SNR/SINR of the target cell/BS/TRP may be lower than a predetermined level. That is, the target cell/BS/TRP may fail to receive the SRS resource for UE positioning, and/or the quality of a timing and/or angle measurement obtained from the SRS resource may be significantly low (e.g., equal to or lower than a certain level). Accordingly, the target cell/BS/TRP may need to exclude the corresponding timing and/or angle measurement because the timing and/or angle measurement is not suitable for use as a measurement for UE positioning. That is, even if the UE receives the DL RS resource for use as the PL reference properly/accurately, SRS transmission according to the original purpose may not be helpful at all.

Therefore, reception of the DL RS resource to be used as the PL reference may not be helpful at all for UL transmission, which is the original purpose. In conclusion, if the UE transmits the SRS resource with the maximum transmission power, it may consume the battery of the UE and/or waste radio resources.

According to various embodiments, if a specific DL RS resource for use as the PL reference is configured for the UE and if the UE successfully receives the DL RS resource, the UE may determine/decide detection failure/reception failure. According to various embodiments, it is possible not only to prevent the UE from transmitting an SRS resource with the maximum transmission power in the above case but also to avoid battery consumption and/or radio resource waste of the UE.

According to various embodiments, a fallback mode of power control of SRS transmission for positioning may be defined as follows.

For example, if the UE determines that the UE is incapable of measuring $PL_{b,\,f,\,c}(q_d)$ accurately, the UE may calculate/obtain $PL_{b,\,f,\,c}(q_d)$ based on an RS resource obtained from an SS/PBCH block used to acquire a master information block (MIB).

For example, only an open-loop power control mechanism may be supported. If the UE receives a PL reference for an SRS for positioning configurations from the serving cell and/or neighbor cell, but if the UE is incapable of successfully measuring the path loss for the provided PL reference, the UE may use an RS resource obtained from an SS/PBCH block used to obtain an MIB as a PL reference signal.

In the description of various embodiments, detection/reception/decoding failure decision/determination may be replaced with measurement failure decision/determination.

In the description of various embodiments, detection/reception/decoding failure decision/determination may be replaced with measurement failure decision/determination.

According to various embodiments, a criterion for determining whether an RS transmitted from a neighbor cell/TP/BS could not be accurately measured may be provided.

For example, a level of accuracy may be provided regarding the term "exactly". Specifically, examples related to measurement/detection failure may be provided. For example, an example related to how many times the UE estimates detection/measurement failure may be provided.

For example, an absolute criterion/threshold may be provided. Specifically, the absolute criterion/threshold may be related to RSRP/RSRQ/SNR/SNIR. For example, the absolute criterion/threshold may be related to how many times it occurs within a specific window. The absolute criterion/threshold may be related to an accuracy level and/or measurement reliability.

For example, a relative criterion/threshold may be provided.

Figure 14:
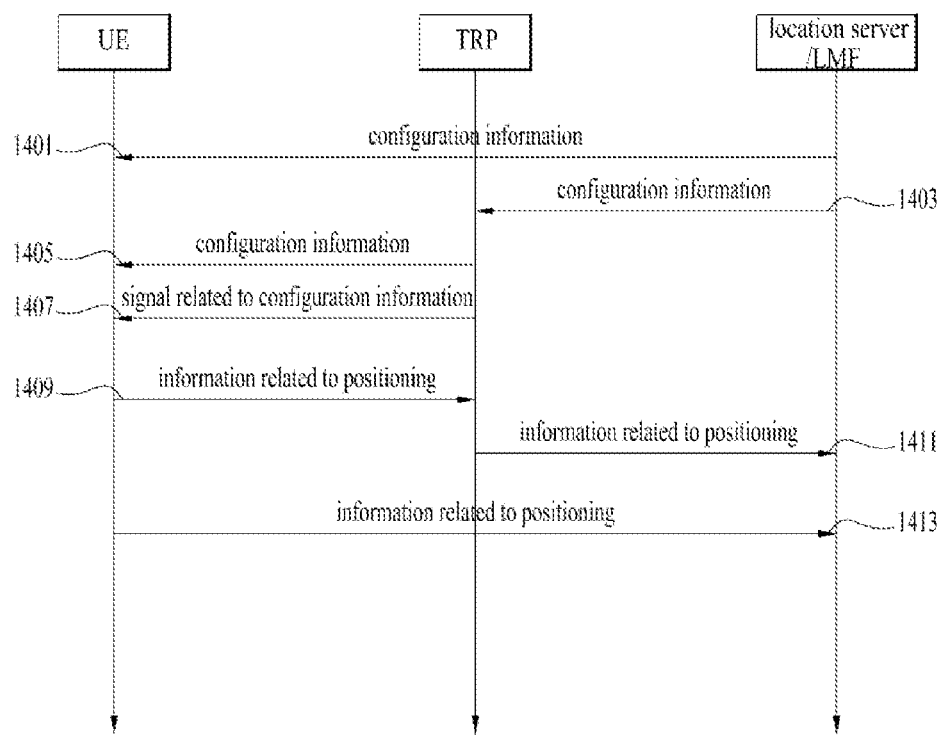
FIG. 14 is a simplified diagram illustrating a method of operating a UE, a transmission and reception point (TRP), a location server, and/or a location management function (LMF) according to various embodiments.

FIG. 14 is a simplified diagram illustrating an operating method of a UE, a TRP, a location server, and/or an LMF according to various embodiments.

Referring to FIG. 14, in operation 1401 according to various embodiments, the location server and/or the LMF may transmit configuration indicated to the UE and the UE may receive the configuration information.

In operation 1403 according to various embodiments, the location server and/or the LMF may transmit reference configuration information to the TRP and the TRP may receive the reference configuration information. In operation 1405 according to various embodiments, the TRP may transmit the reference configuration information to the UE and the UE may receive the reference configuration information. In this case, operation 1401 according to various embodiments may be omitted.

In contrast, operations 1403 and 1405 according to various embodiments may be omitted. In this case, operation 1401 according to various embodiments may be performed.

That is, operation 1401 according to various embodiments, and operations 1403 and 1405 according to various embodiments may be selectively performed.

In operation 1407 according to various embodiments, the TRP may transmit a signal related to the configuration information and the UE may receive the signal related to the configuration information. For example, the signal related to the configuration information may be a signal for positioning of the UE.

In operation 1409 according to various embodiments, the UE may transmit a signal related to positioning to the TRP and the TRP may receive the signal related to positioning. In operation 1411 according to various embodiments, the TRP may transmit the signal related to positioning to the location server and/or the LMF and the location server and/or the LMF may receive the signal related to positioning.

In operation 1413 according to various embodiments, the UE may transmit the signal related to positioning to the location server and/or the LMF and the location server and/or the LMF may receive the signal related to positioning. In this case, operations 1409 and 1411 according to various embodiments may be omitted.

In contrast, operation 1413 according to various embodiments may be omitted. In this case, operations 1409 and 1411 according to various embodiments may be performed.

That is, operations 1409 and 1411 according to various embodiments, and operation 1413 according to various embodiments may be selectively performed.

According to various embodiments, the signal related to positioning may be obtained based on the configuration information and/or the signal related to the configuration information.

Figure 15:
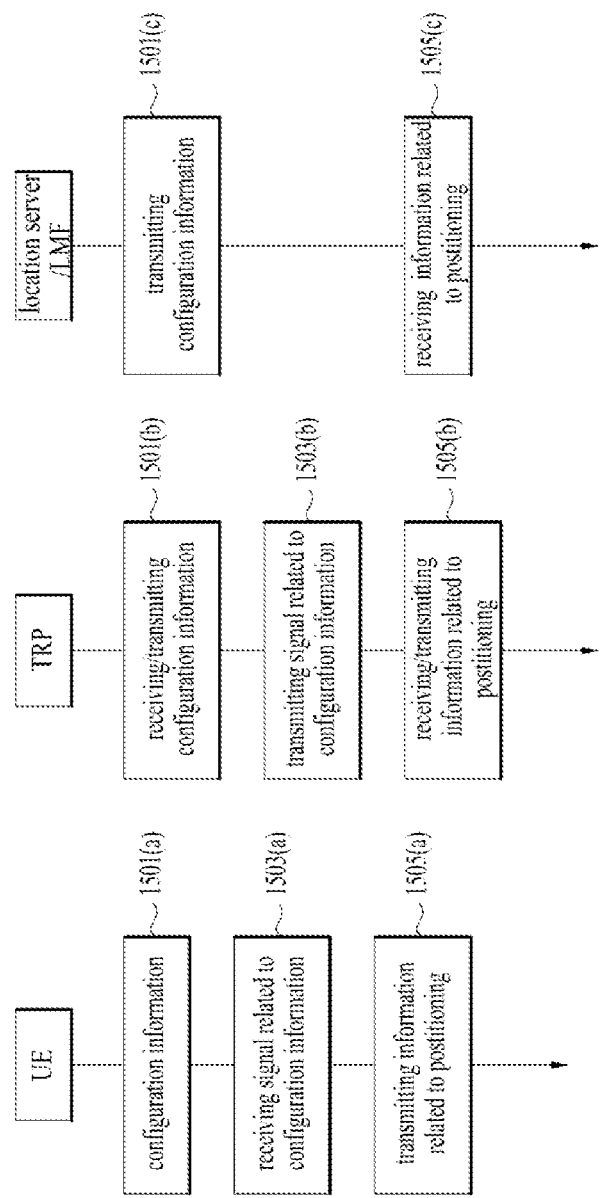
FIG. 15 is a simplified diagram illustrating a method of operating a UE, a TRP, a location server, and/or an LMF according to various embodiments.

FIG. 15 is a simplified diagram illustrating an operating method of a UE, a TRP, a location server, and/or an LMF according to various embodiments.

Referring to FIG. 15(a), in operation 1501(a) according to various embodiments, the UE may receive configuration information.

In operation 1503(a) according to various embodiments, the UE may receive a signal related to the configuration information.

In operation 1505(a) according to various embodiments, the UE may transmit information related to positioning.

Referring to FIG. 15(b), in operation 1501(b) according to various embodiments, the TRP may receive configuration information from the location server and/or the LMF and transmit the configuration information to the UE.

In operation 1503(b) according to various embodiments, the TRP may transmit a signal related to the configuration information.

In operation 1505(b) according to various embodiments, the TRP may receive information related to positioning and transmit the information related to positioning to the location server and/or the LMF.

Referring to FIG. 15(c), in operation 1501(c) according to various embodiments, the location server and/or the LMF may transmit configuration information.

In operation 1505(*c*) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Proposal #1—Detection Failure Decision Considering Interference

According to various embodiments, the UE may be configured/indicated with a specific DL RS resource (e.g., CSI-RS resource, PRS resource, SSB resource, etc.) transmitted from a neighbor cell/BS/TP rather than the serving cell/BS/TP as a reference DL RS (resource) for determining the transmission power of a UL SRS resource and/or SRS resource set (e.g., SRS for positioning, SRS for CSI-RS/beam management, etc.) of the UE.

According to various embodiments, when the UE receives a DL RS (and/or a DL RS resource), if the amount of power that the UE needs to use (and/or the amount of power that the UE needs to increase) for PL compensation is higher than a specific standard/threshold/level with respect to the received signal strength/power (e.g., RSRP, SNR, SINR, etc.), the UE may operate according to one of the following embodiments.

1) According to various embodiments, the UE may perform decision/determination of detection failure/reception failure for the DL RS (and/or DL RS resource).

=>For example, the operation may be combined with fallback mode behavior. Specifically, even when the UE successfully receives the DL RS (and/or DL RS resource), the UE may determine reception failure and then perform the fallback mode behavior.

2) According to various embodiments, although the UE may skip decision/determination of reception failure, the UE may transmit no SRS resources. Additionally/alternatively, according to various embodiments, even when the UE decides/determines that reception is successful (e.g., when the UE decides/determines that reception of a PL reference DL RS is successful), the UE may transmit no SRS resources. For example, such a UE operation may be configured/instructed by the network (e.g., cell/TP/BS and/or location server/LMF). Additionally/alternatively, according to various embodiments, the UE may transmit the SRS resource with specific transmission power. The specific transmission power may be configured/indicated by the network. In this case, according to various embodiments, the fallback mode behavior of the UE may be ignored. That is, the fallback mode behavior may not be performed. For example, when it is determined/determined that a target cell/BS/TRP is incapable of properly receiving an SRS above a specific level/quality even if the UE uses the maximum transmission power, the UE may transmit no SRS (by deciding/determining/assuming that no PL reference RS is properly received).

For the case of 1), the UE may perform determined/defined/configured/indicated operations (e.g., fallback mode behavior). For example, the transmission power of the SRS resource and/or SRS resource set may be determined based on a specific DL RS (e.g., SS/PBCH block, PRS resource, etc.) transmitted by the serving cell/BS/TRP.

For the case of 2), if it is expected that even if the UE transmits an SRS resource with the maximum power, the target cell/BS/TRP will not properly receive the SRS resource, the UE may not transmit the SRS resource.

SRS resource transmission may be configured periodically/semi-statically/aperiodically. In addition, no SRS transmission from the UE when it is expected that the target cell/BS/TRP will not receive SRS resources properly may be interpreted to mean that the SRS resource transmission configured periodically/semi-static/aperiodic ally is dropped/ignored.

As an example of the case where it is expected that even if the UE transmits an SRS resource with the maximum power, the target cell/BS/TRP will not properly receive the SRS resource, the distance between the UE and target cell/BS/TRP may be greater than or equal to a predetermined level/threshold.

On the other hand, considering that the distance between the UE and target cell/BS/TRP is related to a PL measurement for determining the transmission power (for example, if the distance between the UE and target cell/BS/TRP increases, the PL measurement may increase, and if the distance between the UE and target cell/BS/TRP decreases, the PL measurement may decrease), if the distance between the UE and target cell/BS/TRP is greater than or equal to the predetermined level/threshold, it may be interpreted to mean that the PL measurement is above a prescribed level/threshold. In this case, according to various embodiments, it may be determined that the PL reference and/or PL estimate is successfully received/measured, which may mean that the measured PL estimate (measurement) is greater than or equal to the prescribed level/threshold. The prescribed level/threshold may be related to the maximum available power of the UE for SRS resource transmission.

On the other hand, when SRS resource transmission is configured periodically, and when the distance (and/or PL measurement) between the UE and target cell/BS/TRP is greater than or equal to a predetermined level/threshold, it may be assumed that the SRS resource transmission is dropped/ignored at a first time position according to the periodic SRS configuration. In this case, when it is expected that the target cell/BS/TRP will not properly receive an SRS even when the UE transmits an SRS resource at a second time position, which is next to the first time position, the SRS resource transmission at the second time location may also be dropped/ignored.

As an example of the case where it is expected that the target cell/BS/TRP will not receive an SRS even if an SRS resource is transmitted at the second time position, the PL measurement between the first time position and second time position may not vary and/or the degree of change may be less than or equal to a predetermined level/threshold. As another example, there may be a case where the location of the UE between the first time position and the second time position does not change and/or the degree of change is less than a predetermined level/threshold. For example, the location of the UE may be determined by a positioning method supported by the UE (e.g., UE-based positioning (e.g., positioning based on sensors in the UE) and/or UE-assisted positioning).

According to various embodiments, the "specific standard/threshold/level" that the UE needs to use for the power may be configured/indicated by the BS to the UE through a higher layer parameter. For example, it may be based on at least one of the following embodiments.

Method #1: The specific standard/threshold/level may be configured/indicated based on the ratio and/or difference between the maximum transmission power of the UE and transmission power required for the UE to compensate for PL.

Method #2: The specific standard/threshold/level may be given as an absolute value for the available power of the UE. That is, the maximum amount of power that the UE is allowed to use to transmit an SRS resource and/or SRS resource set to an adjacent/neighbor cell/TP/BS may be configured/indicated, independently of the maximum transmission power of the UE.

Method #3: The threshold may be indicated/configured based on the difference and/or ratio between the amount of power used by the UE to transmit an SRS resource and/or SRS resource set to the serving cell/BS/TRP and the amount of power used to transmit an SRS resource and/or SRS resource set to a neighbor cell/BS/TRP. For example, the power amount may be the maximum power amount. However, this is only an example, and the present disclosure is not limited thereto.

Methods #1 to #3 described above according to various embodiments may be further described as follows.

Method #1: Even if the UE transmits an SRS resource to a neighbor cell/BS/TRP with the maximum available transmission power, the neighbor cell/BS/TRP may not properly receive the SRS resource if the strength/SNR/SINR of a signal received by the neighbor cell/BS/TRP is too low. On the other hand, strong interference may be given to other cells/BS/TRP including the serving cell/BS/TRP. Thus, even if the UE transmits the SRS resource with the maximum transmission power, a target neighbor cell/BS/TRP may not receive a meaningful signal (e.g., a signal with strength/SNR/SINR available for positioning). Therefore, in this case, the cell/BS/TRP may instruct the UE to transmit the SRS with low transmission power rather than the maximum transmission power based on Method #1 according to various embodiments, thereby improving the overall network performance Method #2: When the UE transmits an SRS resource above a predetermined level, if it interferes with a neighbor cell/TRP/BS and/or increases the received signal level of the serving cell/TRP/BS, it may be difficult for the serving cell/TRP/BS to receive SRS resources transmitted by other UEs at the same time. Thus, in this case, it may be advantageous to limit the power to a specific value based on Method #2 according to various embodiments, independently of the maximum transmission power of the UE.

Method #3: As described above, an SRS resource and/or SRS resource set transmitted by the UE to a neighbor cell/TRP/BS may interfere with the serving cell/TRP/BS. Thus, in this case, it may be necessary to consider a ratio with the power used for an SRS transmitted to the serving cell/TRP/BS based on Method #3 according to various embodiments.

According to various embodiments, if the UE fails to detect/decode/receive a specific DL RS, it may mean that the UE is incapable of obtaining an accurate measurement for the specific DL RS above a predetermined level. Additionally/alternatively, according to various embodiments, if the UE fails to obtain an accurate measurement for a DL RS above a predetermined level may be interpreted as detection/decoding/reception failure for the DL RS.

Proposal #2—Detection Failure Criterion+Behavior

According to various embodiments, the BS may configure/indicate a specific DL RS resource (e.g., CSI-RS resource, PRS resource, and/or SS/PBCH resource) transmitted from a neighbor cell/TRP/BS rather than the serving cell/TRP/BS as a reference DL RS (resource) for determining the transmission power of a UL RS/SRS resource and/or SRS resource set (e.g., SRS for positioning, SRS for CSI acquisition/beam management, etc.) of the UE.

According to various embodiments, the UE may receive a DL RS (and/or DL RS resource) and then determine/decide/judge whether the UE is incapable of correctly/properly receiving the DL RS (and/or DL RS resource) and/or detecting/decoding the DL RS (and/or DL RS resource) (and/or fail to receive) according to rules/regulations/criteria, which are predetermined/predefined and/or configured/indicated by the BS.

According to various embodiments, when the UE fails to receive the DL RS according to a specific rule/regulation/criterion (or when the UE determines reception failure), the UE may calculate/obtain PL compensation based on the DL RS resource received from the serving cell/TRP/BS. Then, the UE may determine the amount of power to transmit the SRS resource and then transmit the SRS. Additionally/alternatively, according to various embodiments, the UE may transmit no SRS. According to various embodiments, such a UE operation may be configured/indicated by the cell/TRP/BS.

According to various embodiments, when the UE receives a DL RS, the cell/TRP/BS may configure/indicate a specific parameter as a rule/regulation/criterion for deciding/determining reception failure for the DL RS. According to various embodiments, the parameter may be a threshold corresponding to a criterion for determination. According to various embodiments, at least one of the following embodiments may be considered.

Method #1: A specific RSRP/RSRQ/SNR/SINR value may be configured/indicated to the UE. Additionally/alternatively, a specific error rate value (e.g., block error rate (BLER), etc.) may be configured/indicated to the UE. According to various embodiments, the above-described values may be used as thresholds.

Method #2: The ratio and/or difference between the transmitted signal power of a DL RS resource and the received signal power of the UE may be configured/indicated to the UE. According to various embodiments, the above-described values may be used as thresholds.

Method #3: The ratio between the RSRP/RSRQ/SNR/SINR of the serving cell and the RSRP/RSRQ/SNR/SINR of a target neighbor cell (i.e., received RSRP/RSRQ/SNR/SINR ratio of the serving cell and the target neighbor cell), for example, the ratio and/or difference between the received power of a DL RS resource transmitted from the serving cell/TRP/BS and the received power of a DL RS resource transmitted from a neighbor cell/TRP/BS may be considered. According to various embodiments, the above-described values may be used as thresholds.

=>According to various embodiments, if a specific value (threshold) configured/indicated according to at least one of Methods #1 to #3 described above exceeds or does not exceed, the UE may decide/determine that the UE does not properly receive a DL RS resource and/or that reception failure occurs. For example, when the threshold is related to RSRP/RSRQ, etc., if the RSRP/RSRQ is less than or equal to the threshold, the UE may decide/determine reception failure. For example, when the threshold is related to SNR/SINR, etc., if the SNR/SINR is more than or equal to a prescribed threshold, the UE may decide/determine reception failure.

Method #4: The cell/TRP/BS may configure/indicate to the UE a specific timer/clock and/or time window for use in determining detection/decoding/reception failure for a DL RS resource (e.g., SSB, CSI-RS, PRS, etc.) transmitted from a neighbor cell/TRP/BS.

=>For example, if the DL RS resource received by the UE does not meet a specific RSRP/SNR/SINR threshold/quality criterion before the configured timer/clock expires/ends, the UE may decide/determine detection/reception failure and then operate as predetermined/predefined and/or configured/instructed. For example, the UE may decide/determine detection/reception failure based on the DL RS resource received by the UE within a time duration from the start of the configured timer/clock to the expiration and/or within a time duration identified by the timer/clock.

Method #5: When the UE determines detection/reception failure for a DL RS resource (e.g., SSB, CSI-RS, PRS, etc.) transmitted from a neighbor cell/TRP/BS, the UE may determine the detection/reception failure by receiving the DL RS multiple times (e.g., K>0 times).

=>For example, if a received RSRP value (e.g., instantaneous and/or semi-static RSRP value without long-term averaging) and/or a specific error rate (e.g., BLER, etc.) is below a specific threshold in a specific reception instance where an RS resource is transmitted/received, the UE may decide/determine failure in reception of the RS resource. In this case, the UE operation may follow a default rule/configuration.

=>For example, instead of determining the RS resource reception failure based on a single reception instance, the UE may decide/determine the RS resource reception failure when the average of K (>0) receptions, RSRP corresponding to a specific top/bottom percentage of the K receptions (preconfigured/predefined percentage, e.g., Y (>0) percentages), and/or the specific error rate is below the specific threshold. For example, the value of K may be configured/indicated by the BS/location server/LMF.

For example, the RSRP corresponding to the top/bottom percentage may defined according to at least one of the following examples:

1) An RSRP value corresponding to top Y percentages of the K receptions and/or a minimum RSRP value from which the top Y percentages begin; and 2) An RSRP value corresponding to bottom Y percentages of the K receptions and/or a maximum RSRP value from which the bottom Y percentages begin.

=>For example, for a DL RS resource (e.g., SSB/PRS/CSI-RS, etc.) transmitted and received with a period of X (>0) milliseconds, if a specific error rate threshold (e.g., BLER threshold, etc.) is not satisfied a specific number of times (e.g., K (>0) times) among the total number of times that the DL RS resource is received within a total time duration (e.g., a specific window), the UE may decide/determine/declare detection/decoding failure for the configured/indicated DL RS resource. Then, the UE may perform a default UL power control operation, which is performed when the UE detects no DL RS resources.

Methods #1/2/3/4/5 according to various embodiments may be applied independently, and/or two or more methods may be combined and then used/applied together. For example, the time window proposed in Method #4 may be applied with other criteria/methods. For example, while a DL RS is received multiple times within a specific time window, if a specific RSRP/SNR/threshold is not satisfied a specific number of times (e.g., M>1) or more, the UE may decide/determine DL RS resource reception failure and perform fallback behavior. In this case, the RSRP/SNR/threshold, etc. may be configured/indicated by the cell/TRP/BS.

According to various embodiments, the UE may determine reception failure for a DL RS resource set, which is set as a PL reference for transmission to a specific cell/TRP/BS, based on the above-described methods/criteria. For example, the PL reference DL RS resource may be configured to determine power for transmitting a specific SRS resource and/or SRS resource set. For example, when the UE determine reception failure for the PL reference DL RS, the UE may operate according to at least one of the following embodiments as described above.

1) The UE may determine SRS transmission power based on a PL reference RS transmitted from the serving cell/TRP/BS.

2) The UE may transmit no SRS.

According to various embodiments, when the time-domain behavior of the SRS is periodic and/or semi-static (e.g., when the SRS is transmitted and received periodically and/or semi-statically in the time domain), there may be resources capable of transmitting the SRS periodically and/or semi-statically. According to various embodiments, when the UE determines reception failure for a PL reference RS transmitted from a specific neighbor cell/TRP/BS, the UE may perform subsequent operations according to at least one of the following embodiments.

1) After determining the reception failure, the UE may transmit no SRS resource before the UE successfully receives a DL PL RS (DL PL reference RS) on an SRS transmission resource configured later. However, for example, if the UE continuously performs measurement for the DL PL RS (DL PL reference RS), calculate/obtain PL for SRS resource transmission, and/or successfully receives the DL PL RS (DL PL reference RS) at a specific time, the UE may transmit an SRS resource on the SRS transmission resource configured later. The UE may report to the network (e.g., cell/TRP/BS, location server/LMF, etc.) that no SRS resource is transmitted at the specific time.

2) After determining the reception failure, the UE may transmit no SRS resource on an SRS transmission resource configured later. That is, for example, the UE may not continuously perform measurement for a DL PL RS (DL PL reference RS) transmitted from a neighbor cell/TRP/BS and/or may not perform calculation/operation for PL compensation.

3) After determining the reception failure, the UE may report the reception failure to the cell/TRP/BS and then drop SRS resource transmission until there is a separate configuration/indication from the BS. For example, the cell/TRP/BS may configure/instruct the UE to change the configured PL reference RS. Specifically, the UE may perform an operation of determining SRS transmission power by performing measurement for the changed PL reference RS. As another example, the UE may be instructed by the cell/TRP/BS to change (e.g., increase) the transmission power for the SRS resource (based on closed-loop power control).

4) The UE may cancel/drop/ignore SRS transmission on all time and/or frequency resources allowed for the SRS transmission.

Hereinafter, details of the SRS according to various embodiments will be described.

Sounding Reference Signal (SRS)

In the NR system to which various embodiments are applicable, spatialRelationInfo may be used when the BS indicates to the UE a transmission beam for use in transmission of a UL channel For example, the BS may configure a DL RS (e.g., SSB resource indicator (SSB-RI), (periodic/semi-static/aperiodic) CSI, etc.) and/or an SRS (e.g., SRS resource) as a reference RS for a target UL channel and/or target RS through an RRC configuration in order to inform the UE which UL transmission beam the UE uses when transmitting a PUCCH and/or SRS. For example, when the BS schedules a PUSCH to the UE, a transmission beam indicated by the BS, which is used for SRS transmission, may be set to a transmission beam for the PUSCH by an SRS resource indicator (SRI) field and then used by the UE as the PUSCH transmission beam.

SRS for Codebook (CB) and Non-Codebook (NCB)

For CB UL (and/or codebook based uplink transmission), the BS may first configure/instruct the UE to transmit an SRS resource set for the purpose of 'CB', and the UE may transmit an n-port SRS resource in the corresponding SRS resource set. For example, the BS may acquire/obtain/identify a UL channel based on the corresponding SRS transmission and then use the UL channel to schedule a PUSCH to the UE. Thereafter, the BS may perform PUSCH scheduling through UL grant DCI (UL DCI) and/or indicate the SRS resource (set) for the purpose of 'CB', which is previously transmitted by the UE, through the SRI field of DCI in order to indicate to the UE a PUSCH (transmission) beam. In addition, the BS may configure/indicate a UL codebook through a transmitted precoding matrix indicator (TPMI) (which indicates a precoder to be applied to one or more layers) in order to configure/indicate a UL rank and/or UL precoder (for example, when multiple SRS resources are configured, the TPMI may be related to an SRS resource selected by the SRI, and/or if one SRS resource is configured, the TPMI may be related to the corresponding SRS resource). For example, the UE may perform PUSCH transmission according to the corresponding indication/configuration.

For NCB UL, the BS may first configure and/or instruct the UE to transmit an SRS resource set for the purpose of 'non-CB', and the UE may determine a precoder for SRS resources in the corresponding SRS resource set based on reception of a non-zero power (NZP) CSI-RS associated/connected with the corresponding SRS resource set to transmit the corresponding SRS resource simultaneously (for example, there may be up to four resources, and one port may be for each resource). Then, the BS may perform PUSCH scheduling through UL grant DCI (UL DCI) and/or indicate at least some of the SRS resources for the purpose of 'non-CB', which are previously transmitted by the UE, through the SRI field of the DCI in order to indicate a PUSCH (transmission) beam of the UE and/or configure/indicate a UL rank and/or UL precoder at the same time. For example, the UE may perform PUSCH transmission according to the corresponding indication/configuration.

SRS for Beam Management

The SRS may be used for beam management (BM). UL BM may be performed by beamformed UL SRS transmission. Whether UL BM is applied to an SRS resource set may be configured by (higher layer parameter) usage. For example, if usage is set to 'BeamManagement (BM)', only one SRS resource may be transmitted in each of a plurality of SRS resource sets at a given time instant. The UE may be configured with one or more sounding reference symbol (SRS) resource sets configured by (higher layer parameter) SRS-ResourceSet (through higher layer signaling, RRC signaling, etc.). For each SRS resource set, the UE may be configured with K>=1 SRS resources (through higher layer parameter SRS-resource). For example, K may be a natural number, and the maximum value of K may be indicated/configured by SRS_capability.

SRS for Antenna Switching

The SRS may be used for acquisition of DL CSI information (e.g., acquisition of DL CSI). In a time division duplex (TDD)-based single cell and/or multi-cell (e.g., carrier aggregation (CA)) environment, the BS may measure the SRS from the UE after scheduling SRS transmission to the UE. In this case, the BS may perform scheduling of a DL signal/channel to the UE based on the SRS measurement on the assumption of DL/UL reciprocity. In addition, for acquisition of SRS-based DL CSI, the SRS may be configured for antenna switching.

In the NR system to which various embodiments are applicable (see 3GPP TS 38.214). The use of the SRS may be configured to the BS and/or UE by higher layer parameters (e.g., usage of the RRC parameter SRS-ResourceSet, etc.). The use of the SRS may be set to BM, CB transmission, NCB transmission, antenna switching, and the like.

Hereinafter, a case in which SRS transmission (i.e., transmission of an SRS resource or SRS resource set) is configured for antenna switching among the above uses will be described in detail.

For example, if the UE has partial reciprocity, SRS transmission based on antenna switching (i.e., transmission antenna switching) may be supported for acquire of DL CSI based on SRS transmission in TDD environments. In general cases, when antenna switching is applied, a time of about 15 µs may be required between SRS resources (and/or between SRS resources and PUSCH/PUCCH resources) for antenna switching of the UE. In consideration of this, a (minimum) guard period as shown in Table 6 may be defined.

TABLE 6

| $\mu$ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

In Table 6, $\mu$ denotes a numerology, $\Delta$ f denotes a subcarrier spacing, and Y denotes the number of symbols in a guard period, that is, the length of the guard period.

Referring to Table 6, the guard period may be configured based on the parameter µ for determining a numerology. In the guard period, the UE may be configured not to transmit any signals. The guard period may be configured to be completely used for antenna switching. The guard period may be configured to be used only for antenna switching.

The guard period may be configured in consideration of SRS resources transmitted in the same slot. When the UE is configured and/or instructed to transmit an aperiodic SRS configured for intra-slot antenna switching, the corresponding UE may transmit use a different transmission antenna for each designated SRS resource to transmit the SRS, and the guard period may be configured between each resource.

As described above, when the UE is configured with an SRS resource and/or SRS resource set configured for antenna switching through higher layer signaling, the UE may be configured to perform SRS transmission depending on UE capabilities related to antenna switching. For example, the UE capabilities related to antenna switching may be '1T2R', '2T4R', '1T4R', '1T4R/2T4R', '1T1R', '2T2R', '4T4R', and the like.

In the description of various embodiments, 'mTnR' may refer to a UE capability of supporting m transmissions and n receptions.

(Example S1) When the UE supports 1T2R, up to two SRS resource sets may be configured with different values for the higher layer parameter resourceType in SRS-ResourceSet set, where each SRS resource set may have two SRS resources transmitted in different symbols. For example, each SRS resource in a given SRS resource set may configure a single SRS port. Additionally/alternatively, the SRS port of a second SRS resource in the SRS resource set may be configured to be associated with a UE antenna port different from the SRS port of a first SRS resource in the same SRS resource set.

(Example S2) When the UE supports 2T4R, up to two SRS resource sets may be configured with different values for the higher layer parameter resourceType in SRS-ResourceSet, where each SRS resource set may have two SRS resources transmitted in different symbols. For example, each SRS resource in a given SRS resource set may configure two SRS ports. Additionally/alternatively, the SRS port pair of a second SRS resource in the SRS resource set may be configured to be associated with a UE antenna port different from the SRS port pair of a first SRS resource in the same SRS resource set.

(Example S3) When the UE supports 1T4R, SRS resource sets may be configured in different ways depending on whether SRS transmission is set to periodic, semi-persistent, and/or aperiodic. First, if SRS transmission is set to 'periodic' or 'semi-persistent', zero SRS resource sets or one SRS resource set consisting of four SRS resources, which are configured based on the higher layer parameter resourceType in SRS-ResourceSet set, may be configured to be transmitted in different symbols. In this case, each SRS resource in a given SRS resource set may configure a single SRS port, and the SRS port for each SRS resource may be configured to be associated with a different UE antenna port. On the other hand, if SRS transmission is set to 'aperiodic', zero SRS resource sets or two SRS resource sets consisting of a total of four SRS resources, which are configured based on the higher layer parameter resourceType in SRS-ResourceSet may be configured to be transmitted in different symbols of two different slots. In this case, the SRS port for each SRS resource in the given two SRS resource sets may be configured to be associated with different UE antenna ports.

(Example S4) When the UE supports 1T1R, 2T2R, or 4T4R, up to two SRS resources sets each consisting of one SRS resource may be configured for SRS transmission. For example, the number of SRS ports of each SRS resource may be set to one, two, or four.

If the indicated UE capability is 1T4R/2T4R, the UE may expect that the same number of SRS ports (e.g., 1 or 2) will be configured for all SRS resources in SRS resource set(s). If the indicated UE capability is 1T2R, 2T4R, 1T4R, or 1T4R/2T4R, the UE may not expect that one or more SRS resource sets configured for antenna switching will be configured or triggered in the same slot. In addition, even if the indicated UE capability is 1T1R, 2T2R, or 4T4R, the UE may not expect that one or more SRS resource sets configured for antenna switching will be configured or triggered in the same slot.

Figure 16:
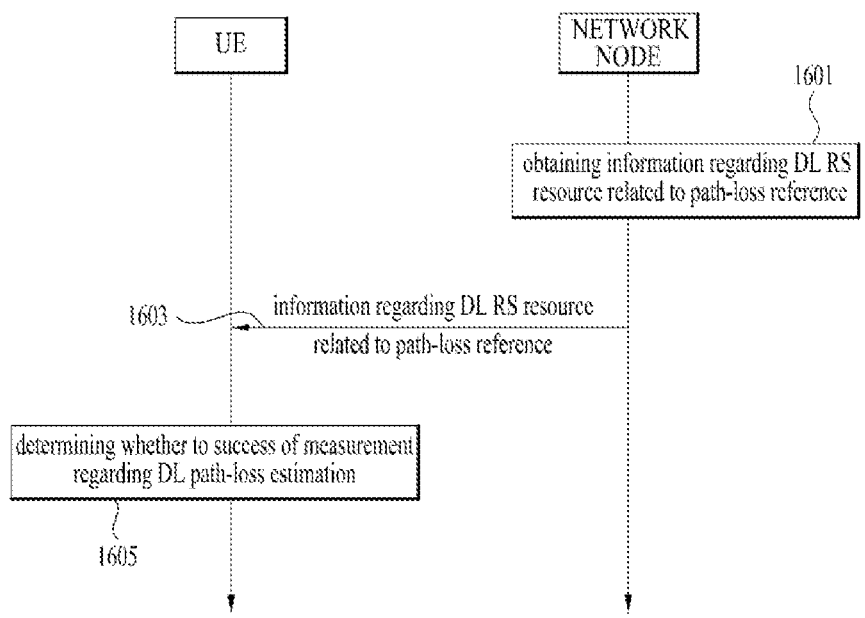
FIG. 16 is a diagram schematically illustrating a method of operating a UE and a network node according to various embodiments.

FIG. 16 is a diagram schematically illustrating a method of operating a UE and a network node according to various embodiments.

Figure 17:
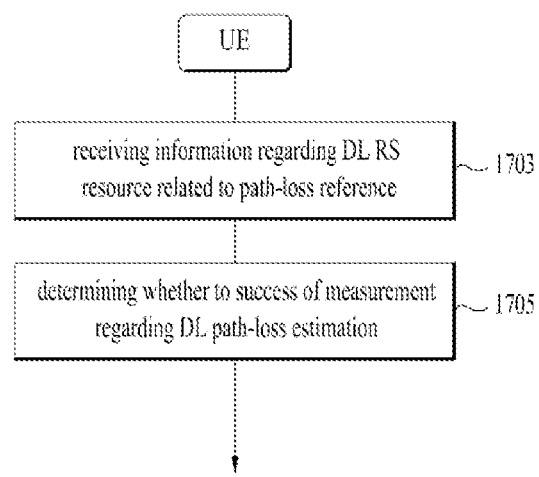
FIG. 17 is a flowchart illustrating a method of operating a UE according to various embodiments.

FIG. 17 is a flowchart illustrating a method of operating a UE according to various embodiments.

Figure 18:
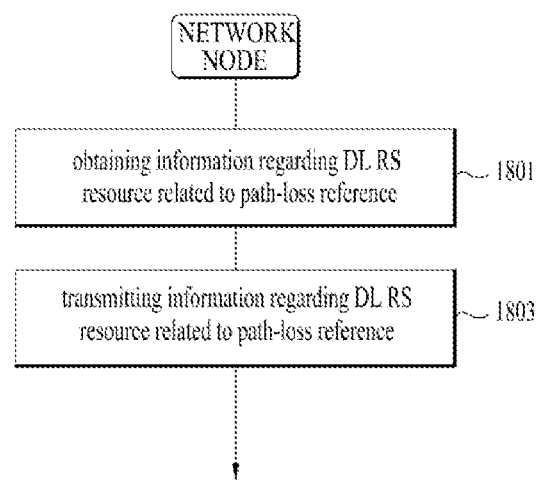
FIG. 18 is a flowchart illustrating a method of operating a network node according to various embodiments.

FIG. 18 is a flowchart illustrating a method of operating a network node according to various embodiments. For example, the network node may be a TP, a BS, a cell, a location server, an LMF, and/or any device performing the same work.

Referring to FIGS. 16 to 18, in operations 1601 and 1801 according to various embodiments, the network node may obtain/generate information on a DL RS resource related to a PL reference.

In operations 1703 and 1803 according to various embodiments, the network node may transmit the information on the DL RS resource related to the PL reference, and the UE may receive the information.

In operations 1605 and 1705 according to various embodiments, the UE may determine whether measurement for PL estimation for obtaining/determining/calculating transmission power of a UL RS is successful, based on the DL RS resource.

According to various embodiments, the DL RS resource may be related to a non-serving cell. For example, the DL RS resource (and/or the PL reference related to the DL RS resource) may be transmitted/received from the non-serving cell. For example, the information on the DL RS resource may be transmitted/received from a serving cell.

According to various embodiments, whether the measurement for the PL estimation is successful may be determined based on a measurement value related to the quality of the DL RS resource.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to Which Various Embodiments are Applied FIG. 19 is a diagram illustrating a device that implements various embodiments.

Figure 19:
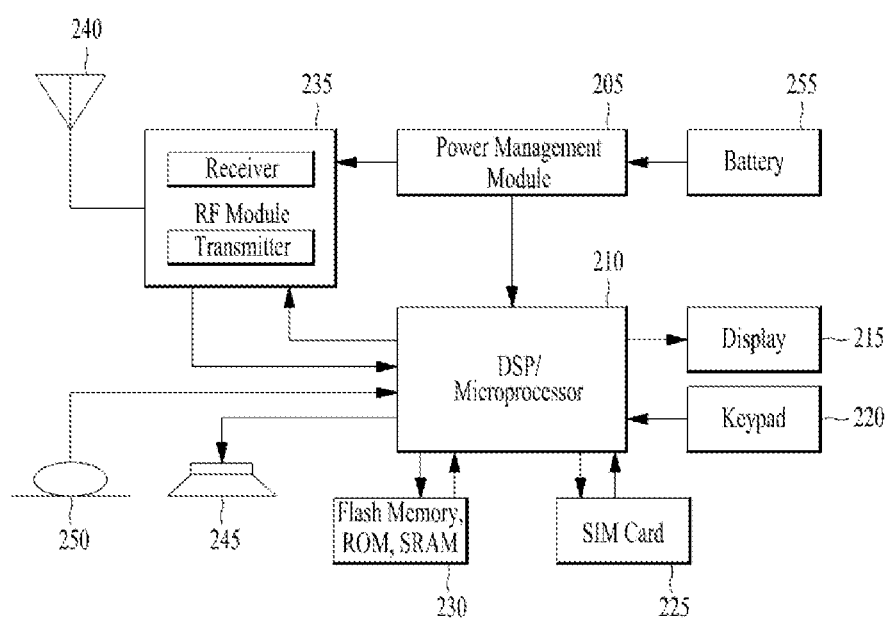
FIG. 19 is a block diagram illustrating an apparatus for implementing various embodiments.

The device illustrated in FIG. 19 may be a UE and/or a BS (e.g., eNB or gNB or TP) and/or a location server (or LMF) which is adapted to perform the above-described mechanism, or any device performing the same operation.

Referring to FIG. 19, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 19 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 19 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or the at least one processor of the communication device included in the UE) may receive information on a DL RS resource related to a PL reference.

According to various embodiments, the at least one processor included in the UE may determine whether measurement for a PL estimation to obtain the transmission power of a UL RS is successful, based on the DL RS resource.

According to various embodiments, the DL RS resource may be related to a non-serving cell.

According to various embodiments, whether the measurement for the PL estimation is successful may be determined based on a measurement value related to the quality of the DL RS resource.

According to various embodiments, at least one processor included in a network node (or at least one processor of a communication device included in the network node) may obtain information on a DL RS resource related to a PL reference.

According to various embodiments, the at least one processor included in the network node may transmit the information on the DL RS resource.

According to various embodiments, the DL RS resource may be to determine whether measurement for a PL estimation to obtain the transmission power of a UL RS is successful.

According to various embodiments, whether the measurement for the PL estimation is successful may be determined based on a measurement value related to the quality of the DL RS resource.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to Which Various Embodiments are Applied In the present specification, various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
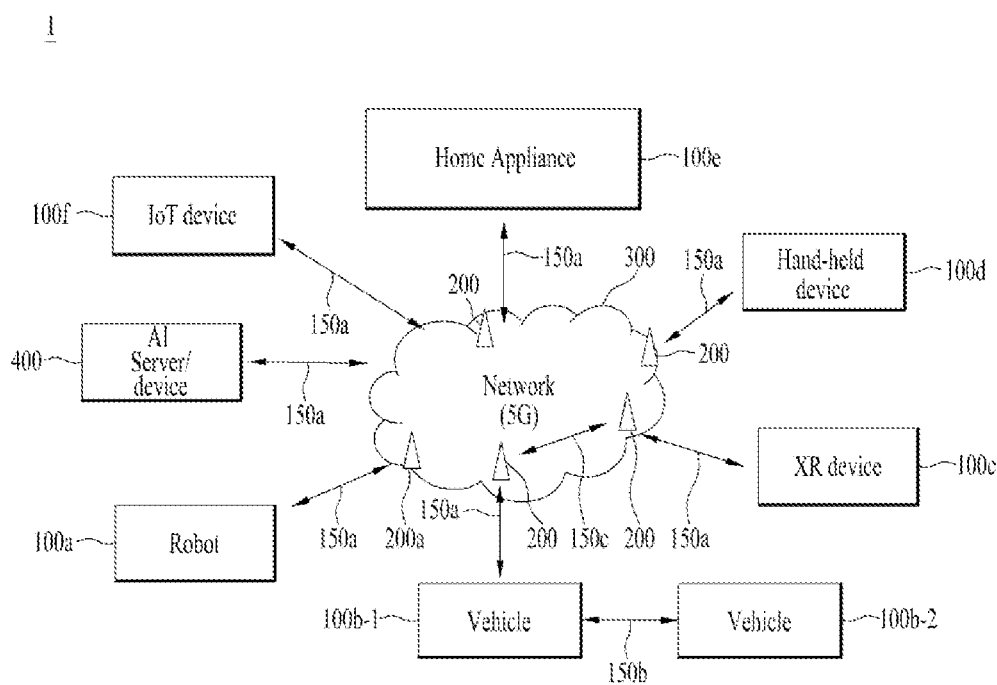
FIG. 20 illustrates an exemplary communication system to which various embodiments are applied.

FIG. 20 illustrates an exemplary communication system to which various embodiments are applied.

Referring to FIG. 20, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

4.2.1 Example of Wireless Devices to Which Various Embodiments are Applied

Figure 21:
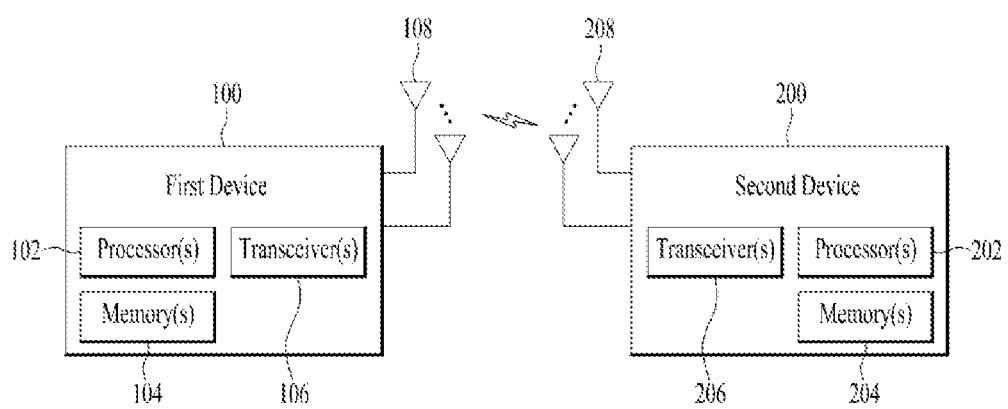
FIG. 21 illustrates exemplary wireless devices to which various embodiments are applicable.

FIG. 21 illustrates exemplary wireless devices to which various embodiments are applicable.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1 .

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the present disclosure.

According to various embodiments, a computer-readable storage medium may store one or more instructions or computer programs which, when executed by one or more processors, cause the one or more processors to perform operations according to various embodiments or implementations of the present disclosure.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 22:
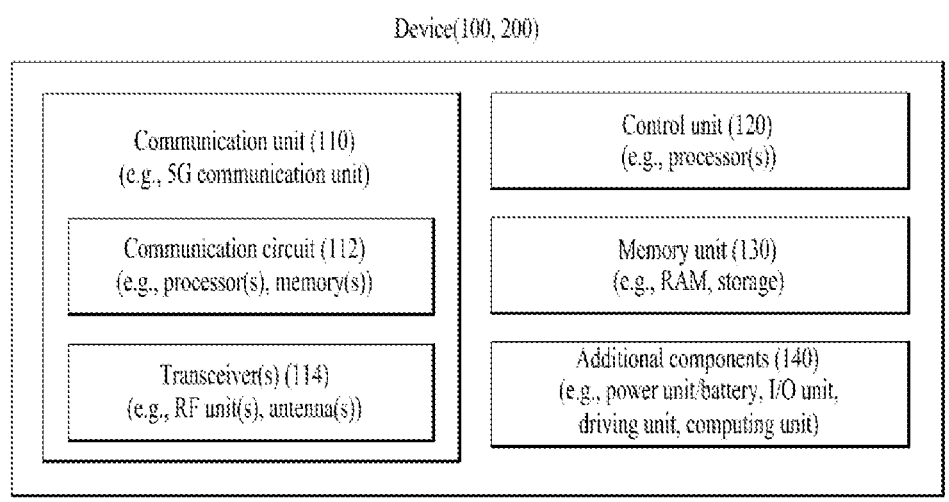
FIG. 22 illustrates other exemplary wireless devices to which various embodiments are applied.

4.2.2. Example of Using Wireless Devices to Which Various Embodiments are Applied FIG. 22 illustrates other exemplary wireless devices to which various embodiments are applied. The wireless devices may be implemented in various forms according to a use case/service (see FIG. 20).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

4.2.3. Example of Portable Device to Which Various Embodiments are Applied

Figure 23:
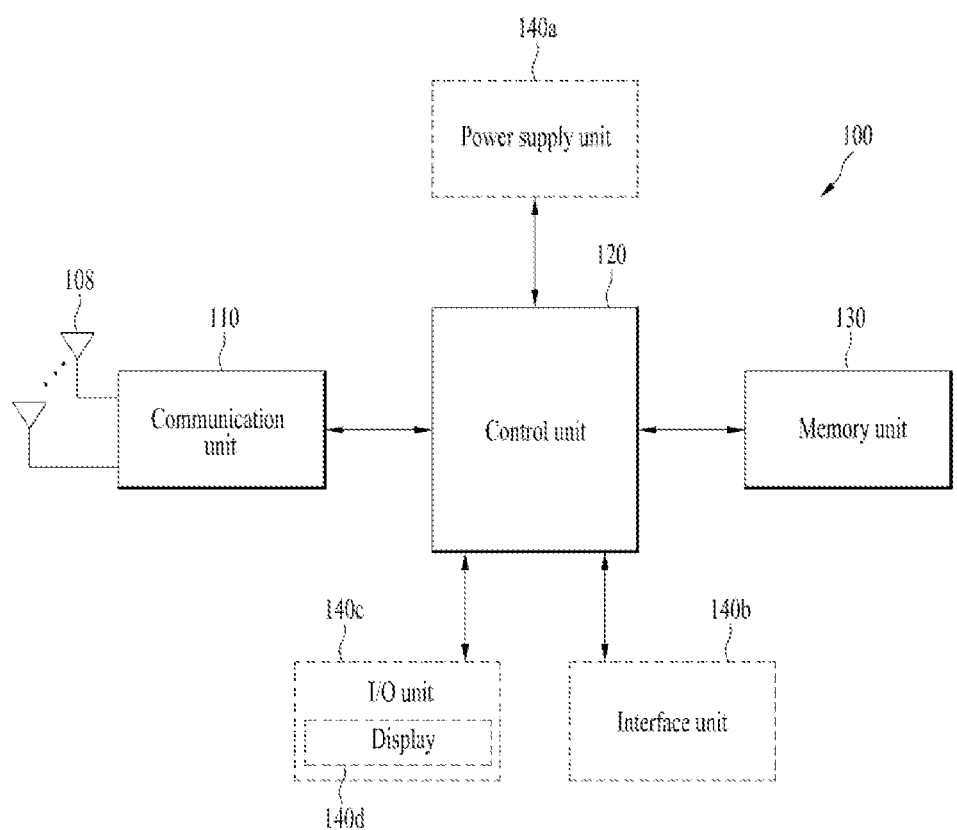
FIG. 23 illustrates an exemplary portable device to which various embodiments are applied.

FIG. 23 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to Which Various Embodiments.

Figure 24:
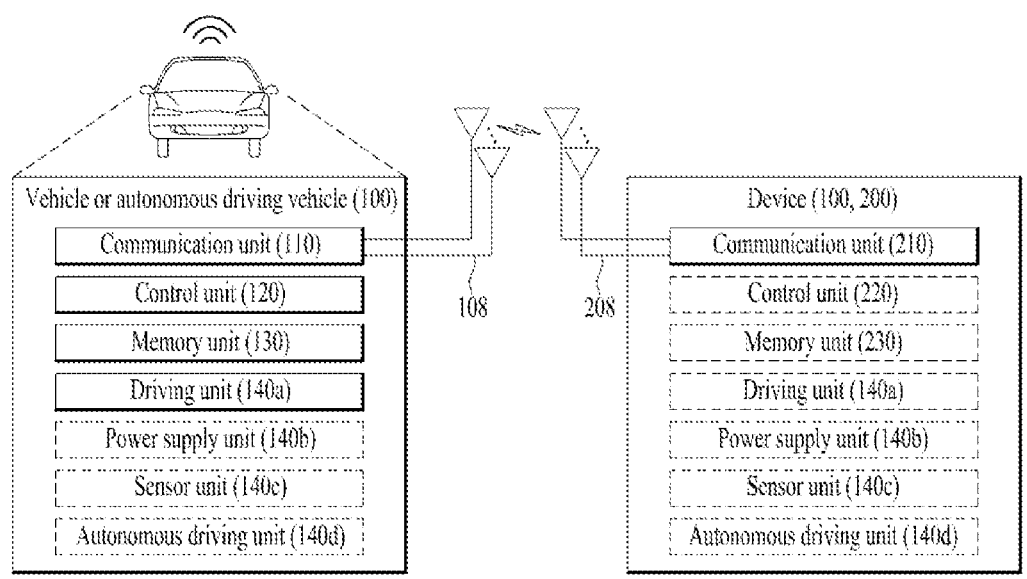
FIG. 24 illustrates an exemplary vehicle or autonomous driving vehicle to which various embodiments.

FIG. 24 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus in a wireless communication system, comprising:
   receiving information on a downlink (DL) reference signal (RS) resource related to a path loss reference; and
   determining whether measurement for a path loss estimation to obtain a transmission power of an uplink (UL) RS is successful, based on the DL RS resource,
   wherein the DL RS resource is related to a non-serving cell, and
   wherein whether the measurement for the path loss estimation is successful is determined based on a measurement value related to a quality of the DL RS resource.

2. The method of claim 1, wherein whether the measurement for the path loss estimation is successful is determined based on a comparison result between the measurement value and a first predetermined threshold, and
   wherein the first predetermined threshold is configured for at least one of:
   for comparison with at least one of a reference signal received power (RSRP), a reference signal received quality (RSRQ), a signal-to-noise ratio (SNR), a signal-to-interference-plus-noise ratio (SINR), or an error rate value obtained from the DL RS resource;
   for comparison with at least one of a ratio or difference between a transmission power of the DL RS resource and a reception power of the DL RS resource; or
   for comparison with at least one of a ratio or difference between the reception power of the DL RS resource received from a serving cell and a reception power of another DL RS resource received from the non-serving cell.

3. The method of claim 1, wherein a timer for determining whether the measurement for the path loss estimation is successful is configured, and p1 wherein the DL RS resource corresponds to one or more DL RS resources received before expiration of the timer.

4. The method of claim 1, wherein the DL RS resource corresponds to a plurality of DL RS resources, and
   wherein the measurement value comprises at least one of:
   one or more measurement values related to qualities of one or more DL RS resources received within a predetermined time period among the plurality of DL RS resources;
   an average value of measurement values related to qualities obtained from the plurality of DL RS resources; or
   one or more measurement values included in a predetermined upper or lower range among the measurement values related to the qualities obtained from the plurality of DL RS resources.

5. The method of claim 1, wherein based on determination that the measurement for the path loss estimation is successful and based on the path loss estimation being greater than or equal to a predetermined second threshold, the UL RS is not transmitted, and
   wherein the predetermined second threshold is related to a maximum value allowed for the apparatus to use as the transmission power of the UL RS.

6. The method of claim 5, wherein the UL RS is configured to be transmitted in at least one of the following ways: periodically, semi-statically, or aperiodically, and
   wherein based on the determination that the measurement for the path loss estimation is successful and based on the path loss estimation being greater than or equal to the predetermined second threshold, transmission of the UL RS at a time position at which the UL RS is scheduled to be transmitted, which is obtained based on transmission of the configured UL RS, is ignored.

7. The method of claim 5, wherein the predetermined second threshold is related to at least one of:
   at least one of a ratio or difference between a transmission power required for a path loss compensation to obtain the transmission power of the UL RS and a maximum transmission power of the apparatus depending on a capability of the apparatus;
   a maximum transmission power allowed for the apparatus to transmit the UL RS to the non-serving cell; or
   at least one of a ratio or difference between a transmission power allowed for the apparatus to transmit the UL RS to a serving cell and the transmission power allowed for the apparatus to transmit the UL RS to the non-serving cell.

8. The method of claim 1, further comprising reporting failure in the measurement for the path loss estimation based on determination that the measurement for the path loss estimation is unsuccessful.

9. The method of claim 1, wherein the UL RS comprises a sounding reference signal (SRS) for positioning of the apparatus.

10. An apparatus configured to operate in a wireless communication system, the apparatus comprising:
    a memory; and
    one or more processors connected to the memory,
    wherein the one or more processors are configured to:
    receive information on a downlink (DL) reference signal (RS) resource related to a path loss reference; and
    determine whether measurement for a path loss estimation to obtain a transmission power of an uplink (UL) RS is successful, based on the DL RS resource,
    wherein the DL RS resource is related to a non-serving cell, and
    wherein whether the measurement for the path loss estimation is successful is determined based on a measurement value related to a quality of the DL RS resource.

11. The apparatus of claim 10, wherein the apparatus is configured to communicate with at least one of a mobile terminal, a network, or an autonomous driving vehicle other than a vehicle including the apparatus.

12. A method performed by an apparatus in a wireless communication system, the apparatus comprising:

obtaining information on a downlink (DL) reference signal (RS) resource related to a path loss reference; and transmitting the information on the DL RS resource, wherein the DL RS resource is to determine whether measurement for a path loss estimation to obtain a transmission power of an uplink (UL) RS is successful, wherein the DL RS resource is related to a non-serving cell, and wherein whether the measurement for the path loss estimation is successful is determined based on a measurement value related to a quality of the DL RS resource.

13. An apparatus configured to operate in a wireless communication system, the apparatus comprising:

a memory; and one or more processors connected to the memory, wherein the one or more processors are configured to:

obtain information on a downlink (DL) reference signal (RS) resource related to a path loss reference; and transmit the information on the DL RS resource, wherein the DL RS resource is to determine whether measurement for a path loss estimation to obtain a transmission power of an uplink (UL) RS is successful, wherein the DL RS resource is related to a non-serving cell, and wherein whether the measurement for the path loss estimation is successful is determined based on a measurement value related to a quality of the DL RS resource.

* * * * *